(12) United States Patent
Manson

(10) Patent No.: US 7,321,364 B2
(45) Date of Patent: Jan. 22, 2008

(54) AUTOMATED TRANSLATION OF HIGH ORDER COMPLEX GEOMETRY FROM A CAD MODEL INTO A SURFACE BASED COMBINATORIAL GEOMETRY FORMAT

(75) Inventor: Steven J Manson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 384 days.

(21) Appl. No.: 10/838,411

(22) Filed: May 4, 2004

(65) Prior Publication Data

US 2004/0233194 A1    Nov. 25, 2004

Related U.S. Application Data

(60) Provisional application No. 60/471,580, filed on May 19, 2003.

(51) Int. Cl.
    *G06T 17/00* (2006.01)
(52) U.S. Cl. .................................. 345/420; 345/419
(58) Field of Classification Search ................ 345/419, 345/420, 619; 700/98; 703/1, 2
    See application file for complete search history.

(56) References Cited

U.S. PATENT DOCUMENTS

| 5,537,519 A |   | 7/1996 | Vossler |
|---|---|---|---|
| 7,096,206 B2 | * | 8/2006 | Hitt ............................. 706/12 |

OTHER PUBLICATIONS

Vadim Shapiro, "Well-Formed Set Representations of Solids" (1997), International Journal of Computational Geometry and Applications (IJCGA).*

E. Eugene Hartquist, BCSG-1.0: A Practical Implementation of Boundary to CSG Conversion, Technical Report CPA93-3, Sibley School of Mechanical & Aerospace Engineering, Cornell University, Aug. 1994.*

Raghothama, S. et al: "Consistent Updates in Dual Representation Systems"; Computer Aided Design, Elsevier Publishers BV., Barking, GB, vol. 32, No. 8-9, Aug. 2000, pp. 463-477, XP004203521, ISSN:0010-4485, etc.

(Continued)

*Primary Examiner*—Ulka Chauhan
*Assistant Examiner*—Daniel F Hajnik
(74) *Attorney, Agent, or Firm*—Noblitt & Gilmore, LLC

(57) ABSTRACT

The descriptions of higher order complex geometry in CAD systems are fundamentally different from and seemingly incompatible with the surface based combinatorial geometry (SBCG) format for describing the same geometry in the context of general ray-tracing applications such as radiation transport. A computer implemented process translates the high order complex geometry embodied in CAD software to the SBCG format. The translation process is comprised of a set of lower-level algorithms that operate on two data sets which are commonly available from commercial CAD software systems. The first data set is a list of trimmed surfaces which make up a given part. These data are typically available from one of the standard geometry representations such as IGES, STEP, or ACIS, at least one of which is supported by each of the major CAD systems (e.g. ProEngineer). The second data set is nodal data: an appropriately dense grouping of point coordinates, designated as either inside or outside the part. These data may be obtained by discretizing solid geometry both within and external to the part of interest using standard FE tools (e.g. ProMechanica). The process translates these two data sets into a list of analytic surfaces and a well-posed zoning statement and then optimizes that statement.

30 Claims, 21 Drawing Sheets

OTHER PUBLICATIONS

Vadim Shapiro et al: "Separation for Boundary to CSG Conversion" ACM Transactions on Graphics, Association for Computing Machinery, New York, US, vol. 12, No. 1, Jan. 1993, pp. 35-55, XP000345444, ISSN: 0730-0301, etc.

Buchele S. F. Roles A C: "Binary Space Partition Tree and Constructive Solid Geometry Representations for Objects Bounded by Curved Surfaces" CCCG-Homepage, Online! 2001, pp. 1-6, XP002309688, Waterloo, CA, USA, etc.

Poutrain K. et al: "Dual Brep-CSG Collision Detection for General Polyhedra" Ninth Pacific Conference on Computer Graphics and Appls., Oct. 16, 2001, pp. 124-133, XP010565956, etc.

Vadim Shapiro et al: "Construction and Optimization of CSG Representations" Computer Aided Design, Elsevier Publishers BV., Barking, GB, vol. 23, No. 1, Jan. 1991, pp. 4-20, XPP000175989, ISSN: 0010-4485 (the whole document).

Anonymous: "Tart 95 Manual—Chapters 1-4" Lawrence Livermore National Laboratory Homepage, 'Online! 1996, pp. 1-79, XP002309801.

Shapiro V.: "Maintenance of Geometric Representations Through Space Decompositions" International Journal of Computational Geometry & Applications World Scientific Singapore, 'Online! vol. 7, No. 1-2, Apr. 1997, pp. 1-31, XP002309802, ISSN: 0218-1959, etc.

\* cited by examiner

| Surface 1 | Surface 2 | Condition | Ambiguity Surface |
|---|---|---|---|
| Plane | None | None | None |
| Plane | Place | None | None |
| Plane | Sphere | None | None |
| Plane | Cylinder | Plane tangent to cylinder | Plane orthogonal to plane, passing through axis of cylinder |
| Plane | Cylinder | Plane aligned with cylinder's axis passing through cylinder | Plane orthogonal to plane, passing through axis of cylinder |
| Plane | Cone | Plane tangent to cone | Plane orthogonal to plane, passing through axis of cone |
| Plane | Cone | Plane aligned with cone's axis and passing through cone | Plane orthogonal to plane, passing through axis of cone |
| Plane | Toroid | Plane tangent to side of toroid | Cylinder of radius equal to major radius of toroid aligned axes |
| Sphere | Toroid | Plane Orthogonal to axis of toroid and passing through toroid | Cylinder of radius equal to major radius of toroid aligned axes |
| Sphere | None | None | None |
| Sphere | Sphere | None | None |
| Sphere | Cylinder | Cylinder circumferentially tangent to sphere | Plane orthogonal to cylinder's axis, passing through center of sphere |
| Sphere | Cylinder | Cylinder with radius smaller than sphere passing through sphere | Plane orthogonal to cylinder's axis, passing through center of sphere |
| Sphere | Cone | Cone tangent to sphere | Orthogonal cone with vertex at sphere center |
| Sphere | Cone | Cone passing through sphere | Orthogonal cone with vertex at sphere center |

Fig. 7a

| Surface 1 | Surface 2 | Condition | Ambiguity Surface |
|---|---|---|---|
| Sphere | Toroid | Sphere tangent to and inside toroid | Plane aligned with toroid's axis, passing through center of sphere |
| Sphere | Toroid | Toroid passing through sphere | Plane aligned with toroid's axis, passing through center of sphere |
| Sphere | Toroid | Toroid tangent to and inside sphere | Cone with vertex at sphere's center, passing through tangent circle |
| Cylinder | None | None | None |
| Cylinder | Cylinder | Cylinder tangent to cylinder | Plan passing through axes of both cylinders |
| Cylinder | Cone | None | None |
| Cylinder | Toroid | Axes alined and cylinder passing through or tangent to toroid | Plane orthogonal to axes and passing through center of toroid |
| Cylinder | Toroid | Cylinder axis tangent to major radius of toroid and radii equal | Plane aligned with axis of toroid and passing through point of tangency |
| Cone | Toroid | Any | Plane passing through vertex, orthogonal to axis |
| Cone | None | None | None |
| Cone | Toroid | Toroid tangent to cone | Cone orthogonal to cone, passing through tangent circle |
| Toroid | None | None | None |
| Toroid | Toroid | Minor radii equal, major radii tangent | Plane aligned with axes, passing through point of tangency |

Fig. 7b

AUTOMATED TRANSLATION OF HIGH ORDER COMPLEX GEOMETRY FROM A CAD MODEL INTO A SURFACE BASED COMBINATORIAL GEOMETRY FORMAT

CROSS-REFERENCE TO RELATED APPLICATIONS

This application claims benefit of priority under 35 U.S.C. 119(e) to U.S. Provisional Application No. 60/471,580 entitled "Computerized Modeling System and Method to Transform Nodal and Parametric Surface Data from CAD Product Form into Efficient, High Accuracy, Combinatorial Geometry" filed on May 19, 2003, the entire contents of which are incorporated by reference.

BACKGROUND OF THE INVENTION

1. Field of the Invention

This invention relates to computer implemented techniques for translating high order complex geometry from the computer aided design (CAD) model to a surface based combinatorial geometry (SBCG) format such as commonly used in nuclear radiation transport, optical design, thermal radiation transport, visual scene rendering or other general ray-tracing applications.

2. Description of the Related Art

The development of geometrical descriptions of hardware in CAD systems is fundamentally different from the concerns in describing the same geometry in the context of radiation transport and other ray-tracing applications. Typically, CAD systems are intended to make it easy to build up and modify complex assemblies based on the design intent of the mechanism. Radiation transport codes, on the other hand, are solely concerned with the motion of energetic particles through matter; neither the design intent nor the mechanical purpose of a part has any significance in this context. To analyze the effects of radiation on systems that were designed using CAD software, those designs must be translated from their native form into a form that is compatible with the requirements of standard radiation transport tools.

While the details of specific commercial CAD geometry data structures are typically proprietary (aside from the standard output formats such as IGES, ACIS and STEP), it is sufficiently illustrative to consider Constructive Solid Geometry (CSG) as a means of building up complicated parts and assemblies from simple geometrical constructs. In CSG, parts are typically designed by performing simple operations such as translation, rotation and scaling on finite primitive solids such as spheres, cylinders, and boxes. Furthermore, objects can be modified in combination by the use of Boolean operators. The set of Boolean operations includes taking the union or intersections of two sets of objects, as well as subtracting the space associated with one set of objects from the solid material associated with another. A simple part 10 comprising a slot 12 having rounded ends 14 formed in abase 16 is shown in FIGS. 1a and 1b. In a CSG framework, this object might be created by instantiating a box that makes up the base of the part, creating two cylinders that comprise the rounded ends of the slot, and next creating a box that joins the two cylinders. Boolean operations can then be performed to join the cylinders with their aligned box, and subtract that union from the original base, leaving the part as depicted. In this framework, very few operations are required to describe rather complicated geometrical shapes. This ability to use successive sets of simple operations to build very complex shapes is rather evocative of the machining process. In fact, the CSG method grew out of generations of 3-D CAD systems that began with the set of primitives familiar to 2-D draftsmen, namely line segments and curves.

Unlike CAD geometry, the dominant paradigm for radiation transport geometry has remained largely unchanged for the last three decades. When the first formulations of the major radiation transport codes were originally proposed by physicists at the national laboratories, minimizing the fraction of the computation cycles devoted to geometry processing was crucial. The computers at the time were capable only of tens of floating-point operations per second, so processing nuclear reaction computations in statistically significant numbers required extremely streamlined geometry calculations.

The solutions that physicists at Lawrence Livermore National Laboratory (LLNL), and Los Alamos National Laboratory (LANL) derived to format data for use in radiation transport codes were, not coincidentally, conceptually the same. The TART (LLNL) and MCNP (LANL) codes use unbounded analytical surfaces to simply bound regions in space. Both codes have input decks that list all the analytical surface definitions, each with a unique index for identification purposes, and further list each unique region of space as a simple sub-list of the surface indices which comprise the boundaries of the region. These surface indices are signed positive or negative based on an arbitrary convention for whether the region (commonly referred to as a cell or zone) of interest lies on the interior or exterior of the analytic surface.

Analytic surfaces have the unique property that a simple closed form equation will yield the surface's points of intersection with an arbitrarily placed vector. Consequently, if the geometry is initially defined by analytic surfaces, the need for any subsequent computations to recover analytic form can be eliminated. Furthermore, having the zones defined in terms of only the signed bounding surfaces minimizes the necessary computations to determine when a particle might leave a zone along any particular trajectory. So the geometry paradigm in radiation transport codes consists of unbounded analytic surfaces knitted together by zone definitions in simple intersection logic (e.g. a well-posed zoning statement). This is referred to as surface-based combinatorial geometry (SBCG). The analytic surface libraries vary from code to code, but typically include, at a minimum, spheres, cylinders, planes, and cones. The definition of such surfaces includes information to translate, rotate and scale them in space.

Current practice to translate the high order complex geometry from the computer aided design (CAD) model to the SBCG format is laborious, time consuming and error prone. Quite literally engineers are provided with CAD drawings of the complex parts and use a ruler and protractor to determine the equations for the analytic surfaces that make up each part. Subsequently, they determine the zoning statement using hand-drawn sketches and trial and error methodology. Returning to the example part, the list of analytic surfaces 20 includes both bounding surfaces 22 (S1-S8) and ambiguity surfaces 24 (S9-S10) which can be used to define zones Z1, Z2, Z3 and Z4 as shown in FIG. 2a for part 10 via a well-posed zoning statement 26 as shown in FIG. 2b required for the SBCG format. This process takes many hours for each part and is prone to human error. A single error can create an ill-posed zoning statement, hence an invalid translation. The complexity of manual translation increases dramatically with complex 3-D parts.

There exists an acute need for a computer implemented process for translating high order complex geometry from the CAD format it was created in to a SBCG format. Such an automated translation would be useful not only in nuclear radiation transport applications but also optical design, stray light analysis, thermal radiation transport, visual scene rendering and other general ray-tracing applications.

SUMMARY OF THE INVENTION

The present invention provides for the automated translation of high order complex geometry from a CAD model into a surface based combinatorial geometry (SBCG) format for use in nuclear radiation transport, optical design, stray light analysis, thermal radiation transport, visual scene rendering and other general ray-tracing applications.

Automated translation is accomplished by extracting the required trimmed surfaces and nodal data from the CAD software and tools, translating that data into a list of analytic surfaces, formulating a well-posed zoning statement, and optimizing that zoning statement. More specifically, the computer calculates analytic bounding surfaces from the list of trimmed surfaces, forms any required analytic ambiguity surfaces, generates lists of part and void space nodes from the nodal data and compares each node to each of the analytic surfaces to formulate the initial zoning statement. The computer may then optimize the zoning statement by eliminating references to redundant surfaces and by merging zones using, for example, a binary minimization algorithm.

In an exemplary embodiment, the CAD software provides a file that includes information about the geometric entities that comprise the part. The computer examines each entity to determine the type of geometric object and maps any surface-type entity to an analytic bounding surface with the proper translation. The computer then performs a comparison of each bounding surface to every other bounding surface to determine if any of a list of conditions is met. If a particular condition is true, the computer generates an analytic ambiguity surface needed for differentiating zones at the intersection of the two bounding surfaces.

The CAD software or associated tool (finite element or random node generation) provides two lists of candidate nodes, one covering the part and the other covering any void spaces. Various techniques are used to ensure that the node lists are sufficiently populated such that even the smallest features of the part are appropriately characterized by nodes within and without.

Armed with this list of analytic bounding and ambiguity surfaces and lists of nodal data, the next step in this exemplary embodiment is to formulate an initial zoning statement by comparing each node to each of the analytic surfaces, designating whether the node lies "inside" or "outside" each of the analytic surfaces with a list of signed numbers ("nodal zoning statement"), and comparing the list to other existing lists corresponding to other nodes. If there is a match, the computer assigns the node the label of the existing identical list. If not, the computer assigns the node a new label. A complete table of these lists of the relationship between nodes and each surface in the geometry comprise the initial zoning statement.

Finally, the initial zoning statement is optimized using a binary minimization algorithm in which these tabular relationship fists are iteratively subdivided into successively smaller sub-tables, until a set of minimally-sized sub-tables is achieved. At this point each sub-table can be solved using a genetic algorithm. This information can be propagated by regressing back through the decomposition process, and repeating the solution procedure with each reunited sub-table until the entire geometry of the part has been reunited.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a and 7b are tables of rules for generating ambiguity surfaces;

DETAILED DESCRIPTION OF THE INVENTION

This invention provides an automated computer-implemented process for translating the CAD model for a part's high order complex geometry into a surface based combinatorial geometry (SBCG) format for use in nuclear radiation transport, optical design, stray light analysis, thermal radiation transport, visual scene rendering and other general ray-tracing applications. Automated translation involves the steps of extracting the required trimmed surfaces and nodal data from the CAD model, translating that data into a list of analytic surfaces and formulating a well-posed zoning statement, and finally optimizing that zoning statement.

Figure 3:
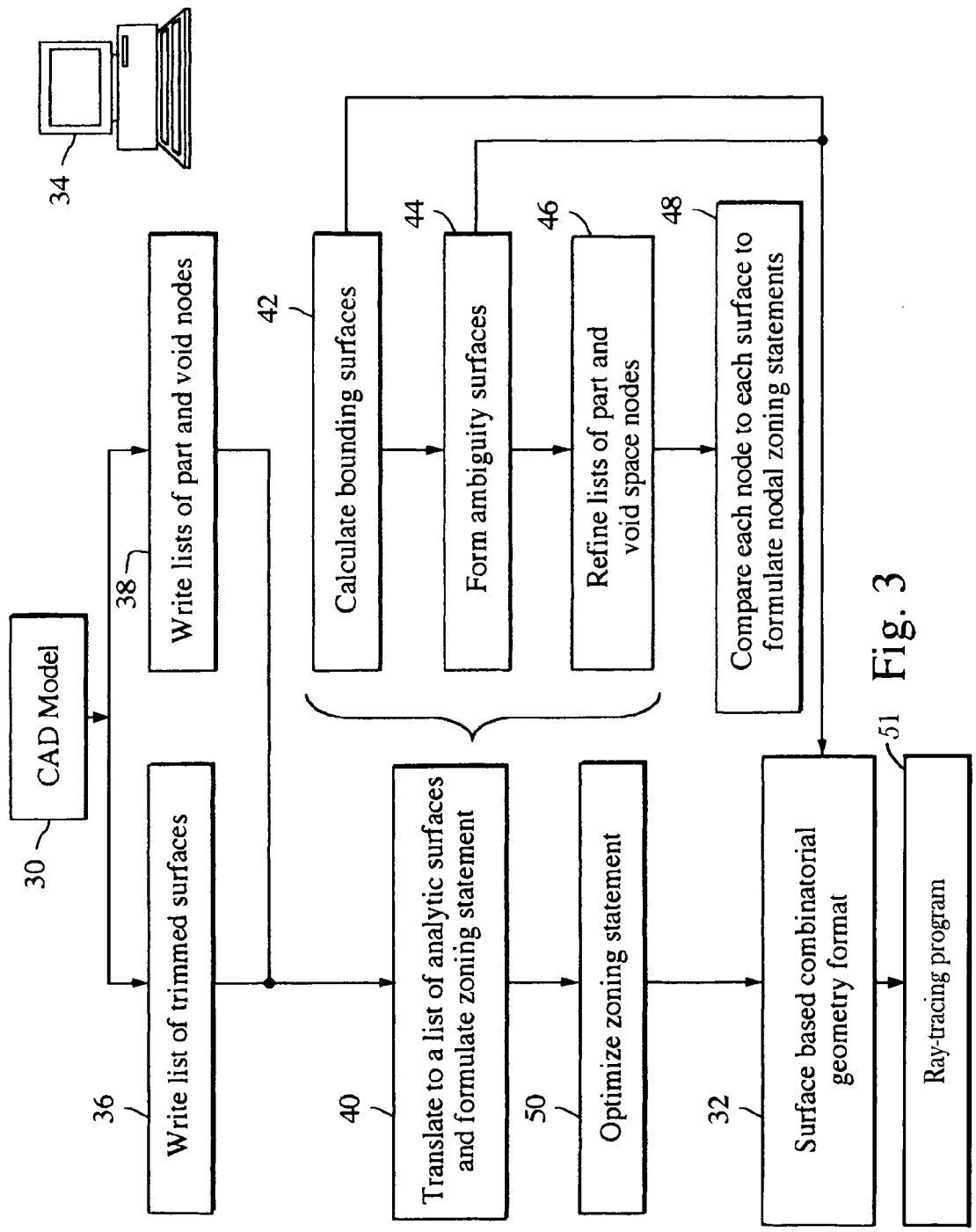
FIG. 3 is a flowchart of an automated process for translating high order complex geometry from a CAD model to a surface based combinatorial geometry (SBCG) format in accordance with the present invention.

As shown in FIG. 3, the high order complex geometry for a part is translated from a CAD Model 30 into a SBCG format 32 using an automated process implemented on a computer 34, which improves speed, accuracy and consistency of the translation. The first step in developing the automated process was to realize that the data required for such an automated translation was readily supported by all major CAD programs such as ProEngineer and finite element (FE) tools such as Pro Mechanica or ANSYS commonly used in conjunction with CAD programs. More specifically, the CAD programs write a list of trimmed surfaces (step 36) as a normal output of forming the three-dimensional CAD models. The CAD program, e.g. a FE tool or a random node generation algorithm, writes a list of nodes for the part and a list for any void spaces (step 38).

The second step was to develop the computer-implemented process for translating the list of trimmed surfaces into a list of analytic surfaces and then using those surfaces and nodal data derived from the candidate nodes to formulate a well-posed zoning statement (step 40). The automated translation and formulation is a four step process in which the computer calculates the analytic equations for bounding surfaces from the list of trimmed surfaces (step 42), forms any required ambiguity surfaces (step 44), refines the lists of part and void space nodes to eliminate any nodes that lie too close to boundary surfaces and to add nodes to ensure sufficient density (step 46) and compares each node to each of the analytic surfaces to form a nodal zoning statement for each unique region of space ("zone") (step 48). The list of nodal zoning statements forms the initial well-posed zoning statement. The automated steps for generating the bounding surfaces ("IGESread"), ambiguity surfaces ("Ambisurf"), and initial zoning statement ("Midnode") are detailed in FIGS. 6a-6f, 7a-7b and 8a-8c, respectively. Once the computer has translated the CAD model into a SBCG format it is generally desirable, although not necessary, to optimize the zoning statement by merging zones and eliminating references to redundant surfaces to improve translation efficiency using, for example, a binary minimization algorithm (step 50). A binary minimization algorithm that recursively bisects the zoning statement into smaller and smaller problems and then solves the sub-problems using a genetic algorithm is detailed in FIGS. 9a-9d ("Break", "Zoner" and "Rebuild"). An example of one instantiation of the automated computer-implemented process is given in FIG. 10. The SBCG format 32 for the part(s) is input to a ray-tracing program to analyze non-mechanical properties of the assembly (step 51).

Figure 1A:
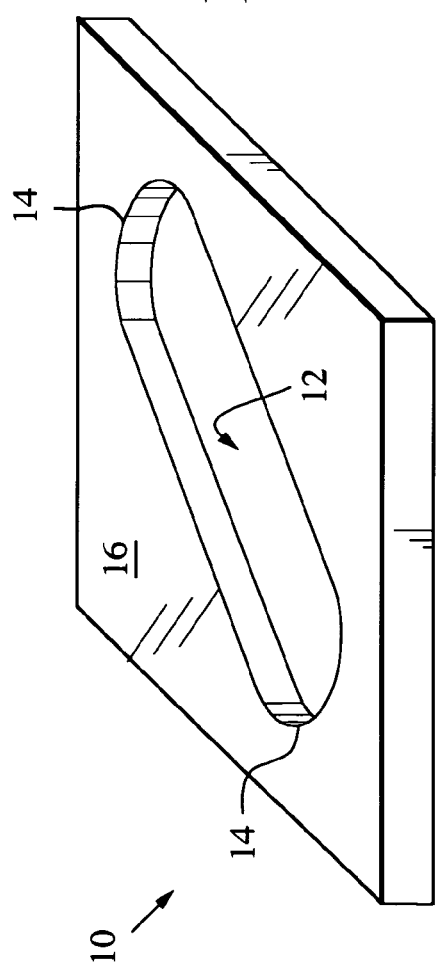
FIGS. 1a and 1b, as described above, are isometric and plan views of a simple 2-D part.
Figure 1B:
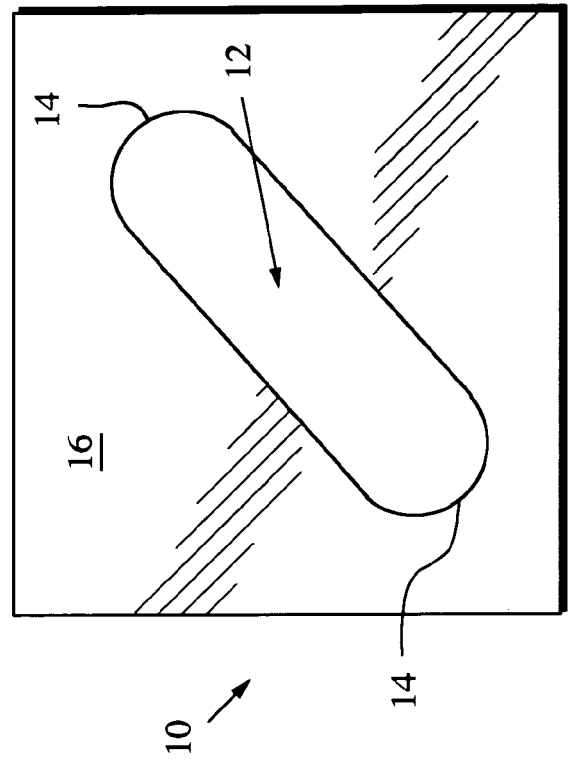
Figures 2A, 2B:
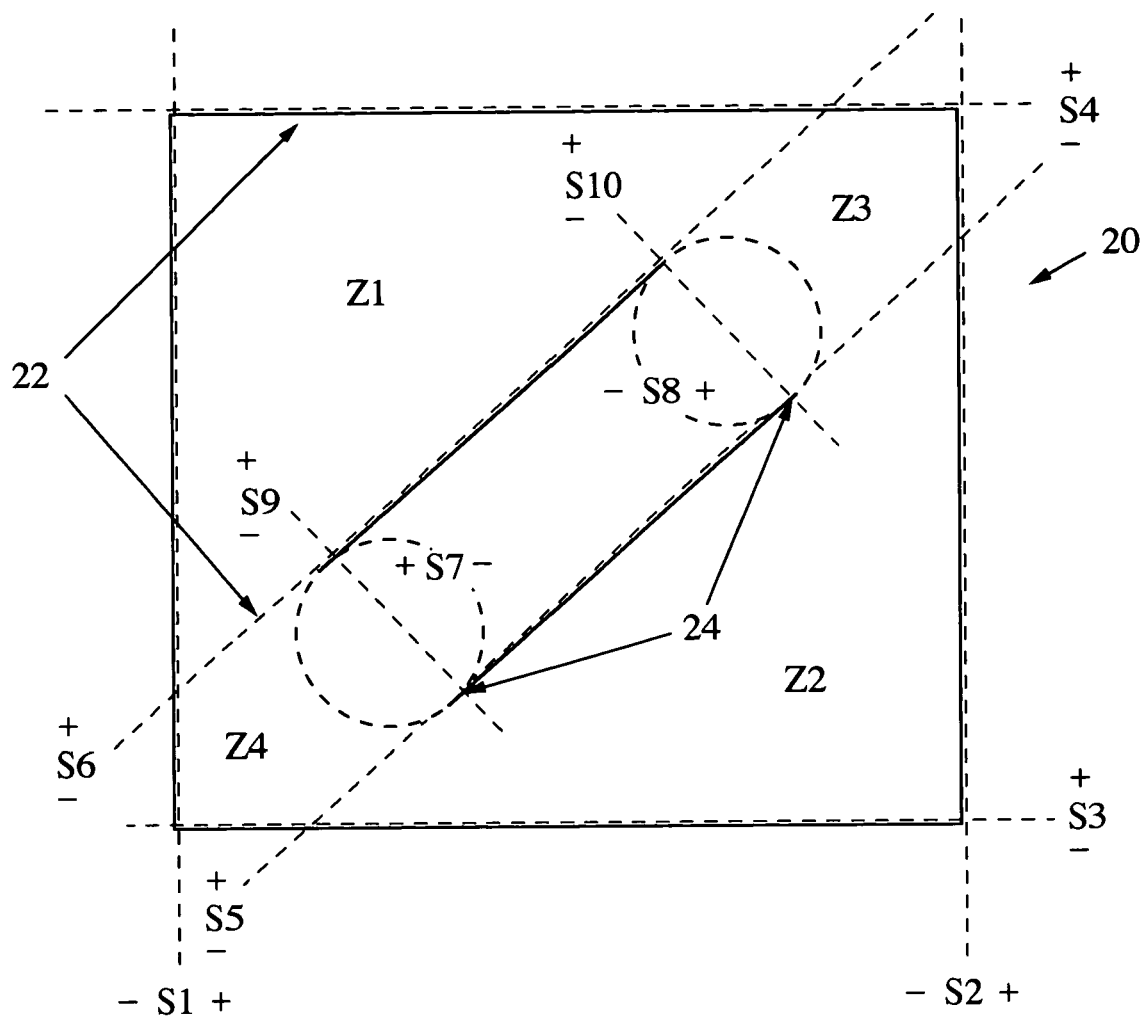
FIGS. 2a and 2b, as described above, are a plan view of the 2-D part with the bounding surfaces and ambiguity surfaces highlighted, and a typical zoning statement for that geometry.
Figure 4A:
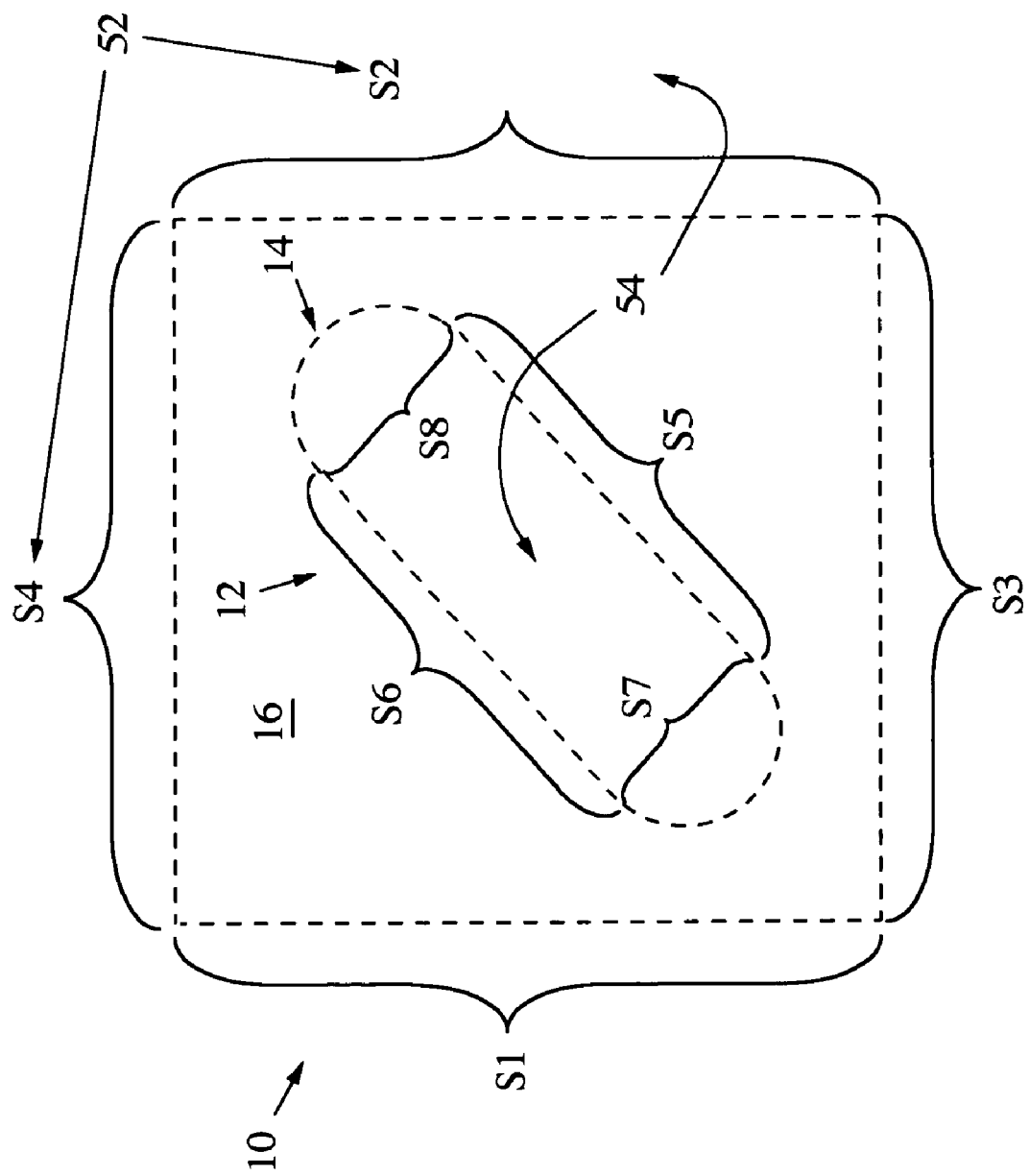
FIG. 4a is a plan view of the 2-D part with the trimmed surfaces generated by the CAD program and FIGS. 4b and 4c are plan views of the nodal mesh generated by a FE program for the 2-D part and the void space, respectively.
Figure 4B:
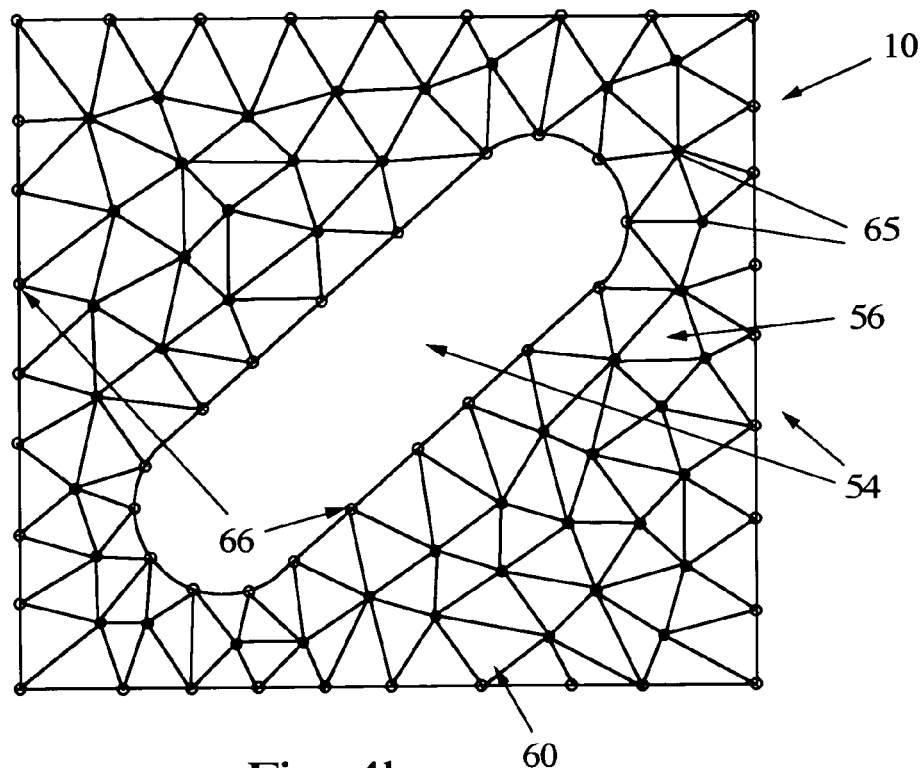
Figure 4C:
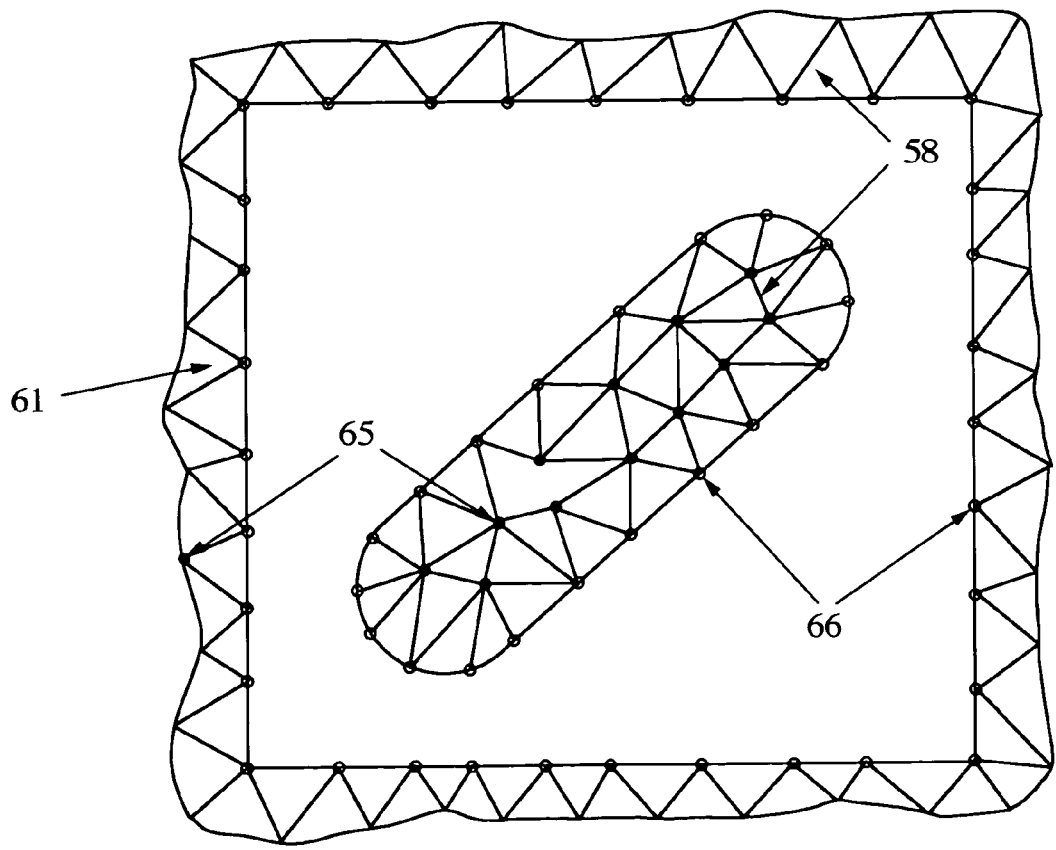
Figure 5:
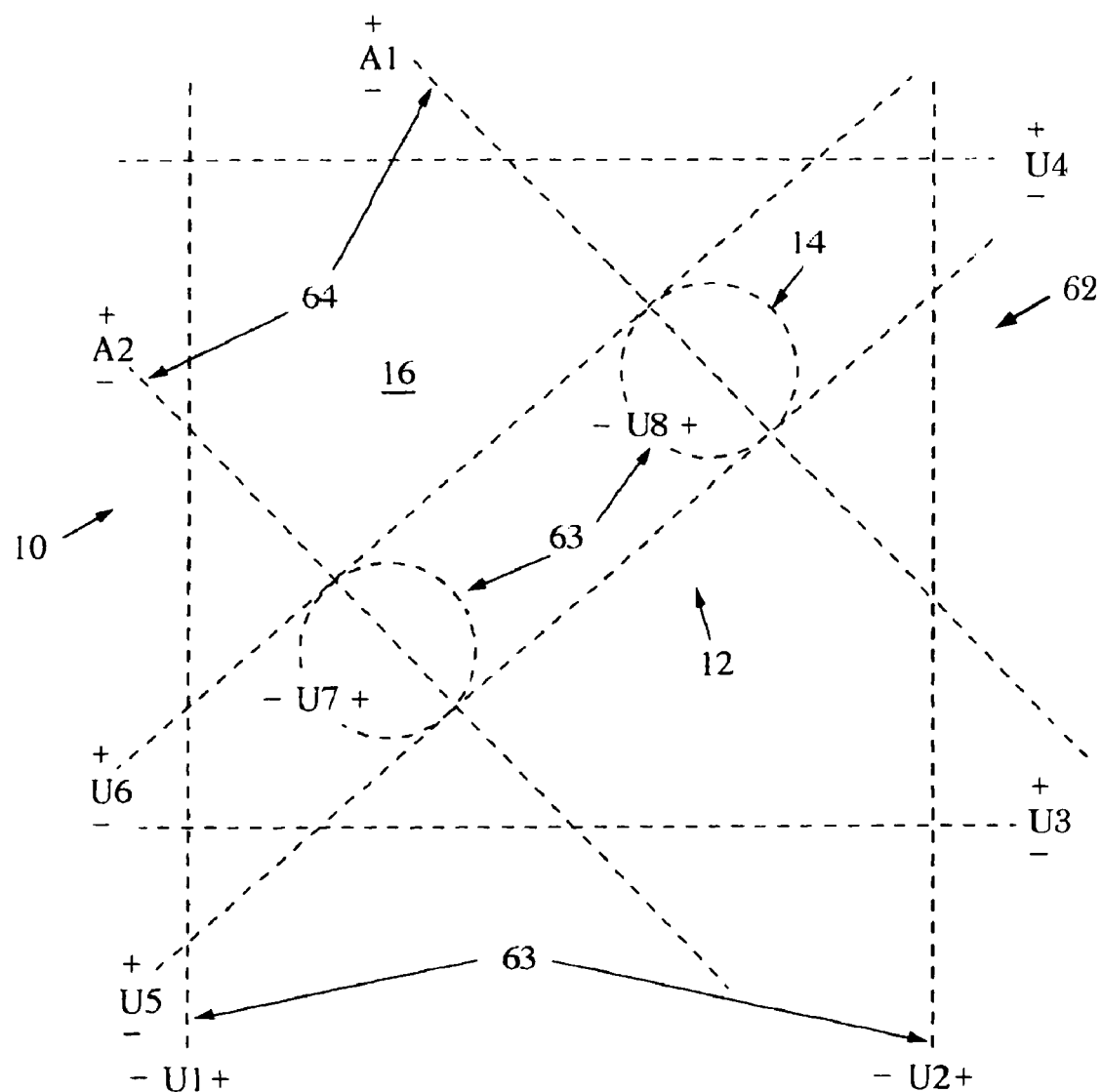
FIG. 5 is a plan view of the 2-D part illustrating the analytic bounding and ambiguity surfaces.
Figure 8A:
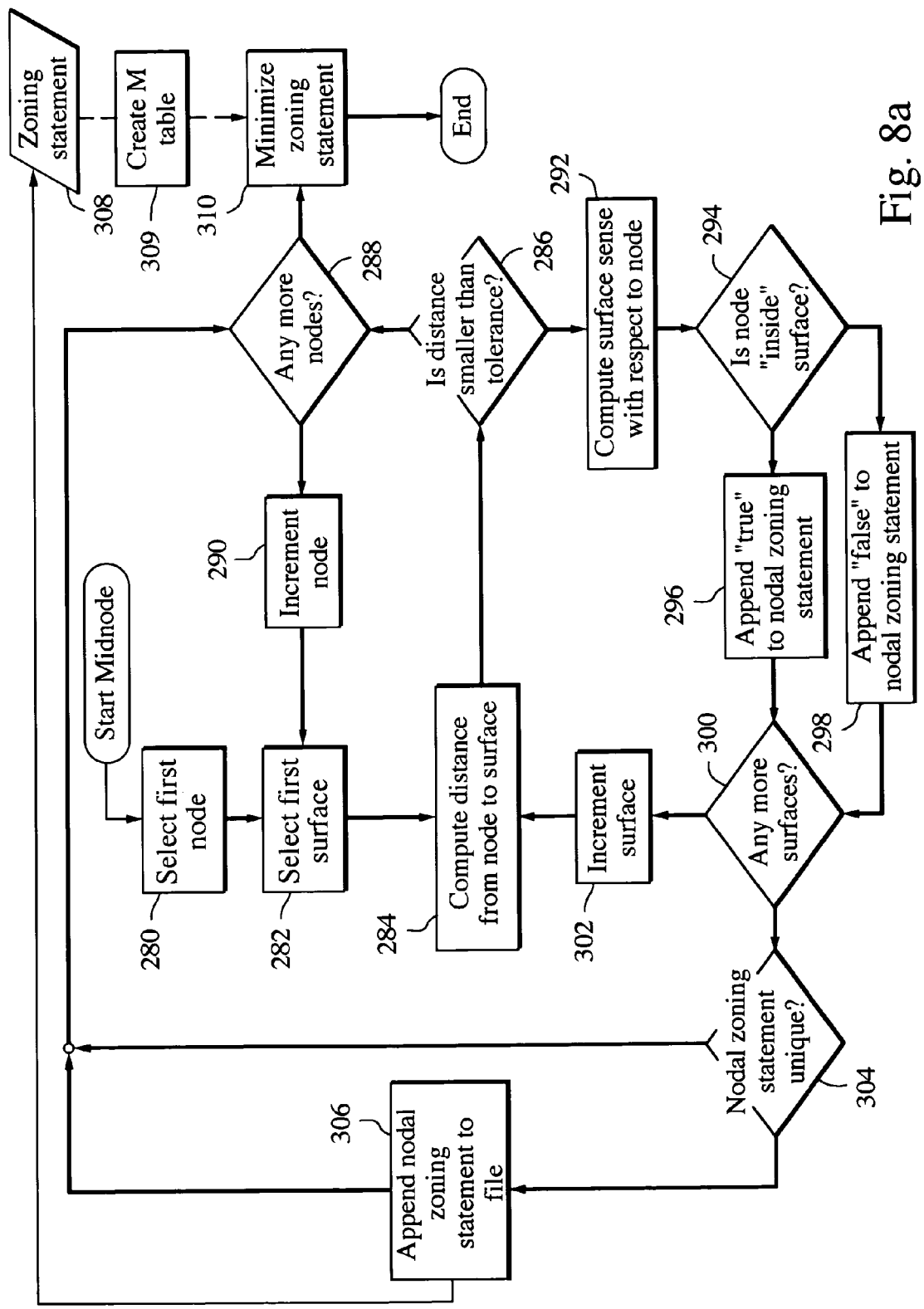
FIGS. 8a through 8c illustrate the steps for formulating an initial zoning statement.
Figures 8B, 8C:
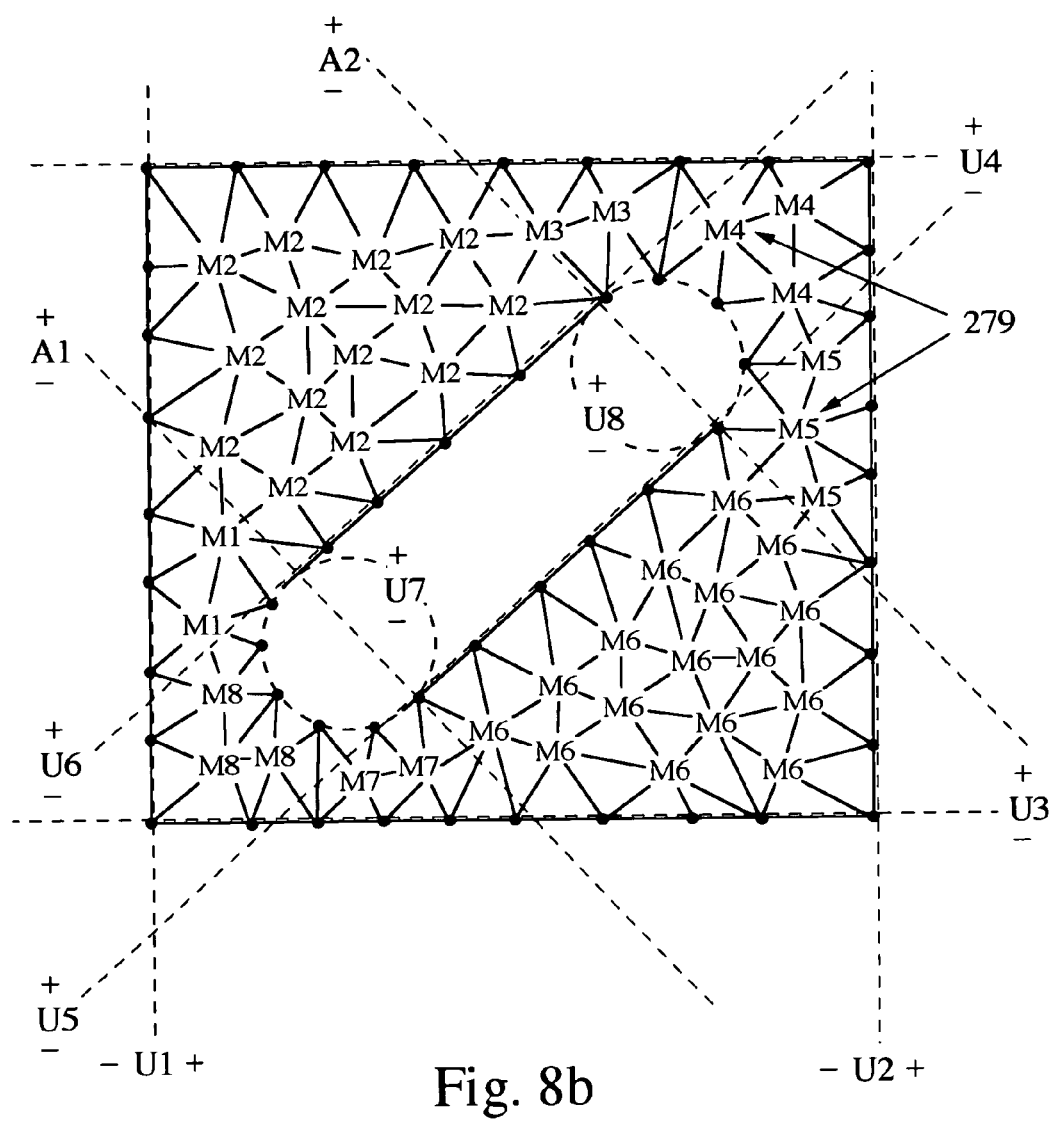

The application of the algorithm to the simple slotted part 10 is illustrated in FIGS. 4, 5 and 8c. The CAD program writes a list trimmed surfaces 52 S1, S2, . . . S8 for the slotted part 10. Surfaces S1, S2, S3 and S4 bound the base 16, surfaces S5 and S6 bound the sides of slot 12, and surfaces S7 and S8 bound the rounded ends 14. The spaces inside slot 12 and outside base 16 define void spaces 54. A FE tool, for example, generates meshes 56 and 58 for the part and any void spaces, respectively. The lists of all of the vertices of each mesh form a pair of lists of candidate nodes 60 and 61 for the part and void spaces. The nodes that are internal to the part or void space are indicated with a closed bullet whereas the nodes that lie on bounding surfaces are indicated with an open bullet. The computer generates a list of analytic surfaces 62 by calculating bounding surfaces 63 U1, U2, U3 and U4 that bound the base 16, surfaces U5 and U6 that bound the sides of slot 12, and surfaces U7 and U8 that bound the rounded ends 14, and forming ambiguity surfaces 64 A1 and A2 where the bounding surfaces are not sufficient to determine whether a node lies in the part or the void space. The computer then refines the lists of nodes 60 and 61 to remove any ambiguous nodes. The first list 60 includes the "closed-bullet" nodes 65 that lie on the part. The second list 61 includes the "closed-bullet" nodes 65 that lie in the void spaces. The "open-bullet" nodes 66 lying on or too near bounding surfaces are discarded. The computer compares each node to each analytic surface to generate a sequence of nodal zoning statements 67 as shown in FIG. 8c. The table of nodal zoning statements 67 forms an initial zoning statement 68. The computer may then optimize the zoning statement to produce, for example, the same zoning statement 26 shown in FIG. 2b generated using the laborious manual process. For clarity of presentation, this example considered only the 2D projection of the slotted part. However, all of the principles and techniques are extensible to the more general 3D representation and to more complicated parts.

Calculate Bounding Surfaces

The task of calculating the bounding surfaces 63 in FIG. 5 from the trimmed surfaces 52 in FIG. 4 is non-trivial. The IGES file structure for the list of trimmed surfaces includes among other things a plurality of entities (trimmed surfaces, line segments, closed curves, coordinate transformations, etc.). Each such entity is characterized by a type number that specifies what sort of geometrical object the entity is and a pointer to the parametric information that specifies the specific data that defines the entity. Additionally, many entity types will also reference a transformation matrix that describes any rotation, translation or scaling of the entity. The computer-implemented process examines each entity to determine whether it is a b-spline surface, torus or sphere, revolved plane, cylinder or revolved cone. As each entity is identified, the trimmed surface is mapped to the corresponding analytic surface with the proper transformation (rotation, translation or scaling) and stored as an entry in the list of analytic surfaces 62.

The IGES (Initial Graphics Exchange Specification) standard is one of the typical geometric representations supported by the major CAD systems. FIGS. 6a through 6f illustrate one possible approach (a code referred to as IGESread) for calculating the bounding surfaces directly from IGES files. The version of IGESread discussed herein was written specifically for use with IGES files written by ProEngineer; however it may be adapted to do the same for IGES files created by other CAD programs. Furthermore, a similar routine could be created to extract data from STEP or ACIS files. Planned extensions of this code will use the same basic techniques already in place to expand the list of applicable surface types, eventually covering the entire library of analytic surfaces in TART and MCNP.

The IGES file specification is a NIST-supported standard that dates from 1979; it is by far the oldest and most widely used mechanism for exchange of model data between CAD products. The IGES file structure consists of five main sections: title, header, entity data, parameter data, and a termination line. The significant portions of the file are the entity and parameter data; the entity section consists of integer and text data that specifies the existence of each node, line, and surface of the construct. Amongst the integers in the entity data is a type number which specifies what sort of geometrical object the entity is, a pointer to a transformation matrix that describes any rotation, translation, or scaling of the entity in space, and a pointer to the first line of parameter data that applies to that specific entity. The parameter data consists of integer and real number data that define the specific features of the entity of interest. Parameters may also include pointers to other entities that help to specify the object.

Figure 6A:
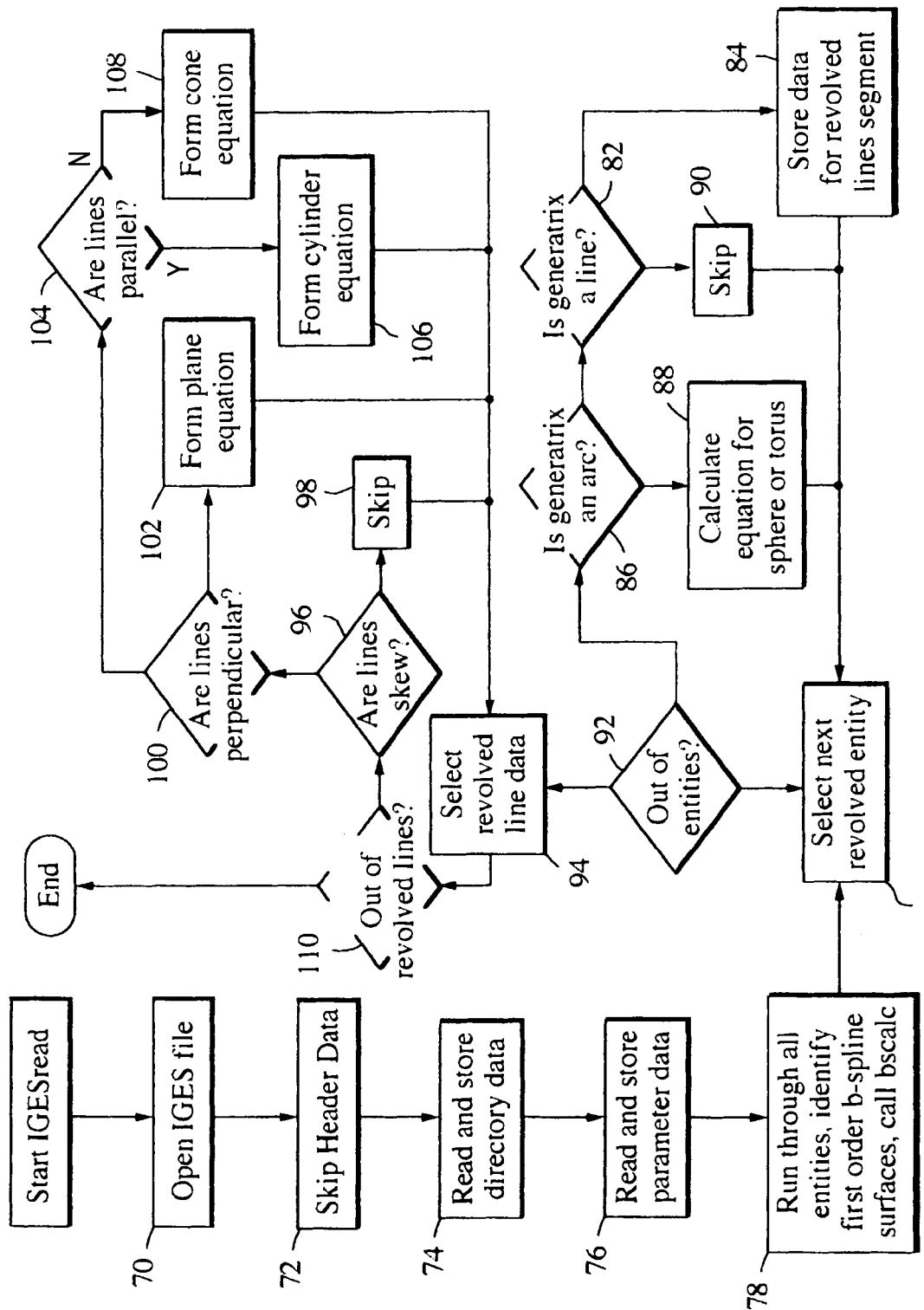
FIGS. 6a through 6f are detailed flowcharts for extracting analytic bounding surfaces from the construction data in IGES files.
Figure 6B:
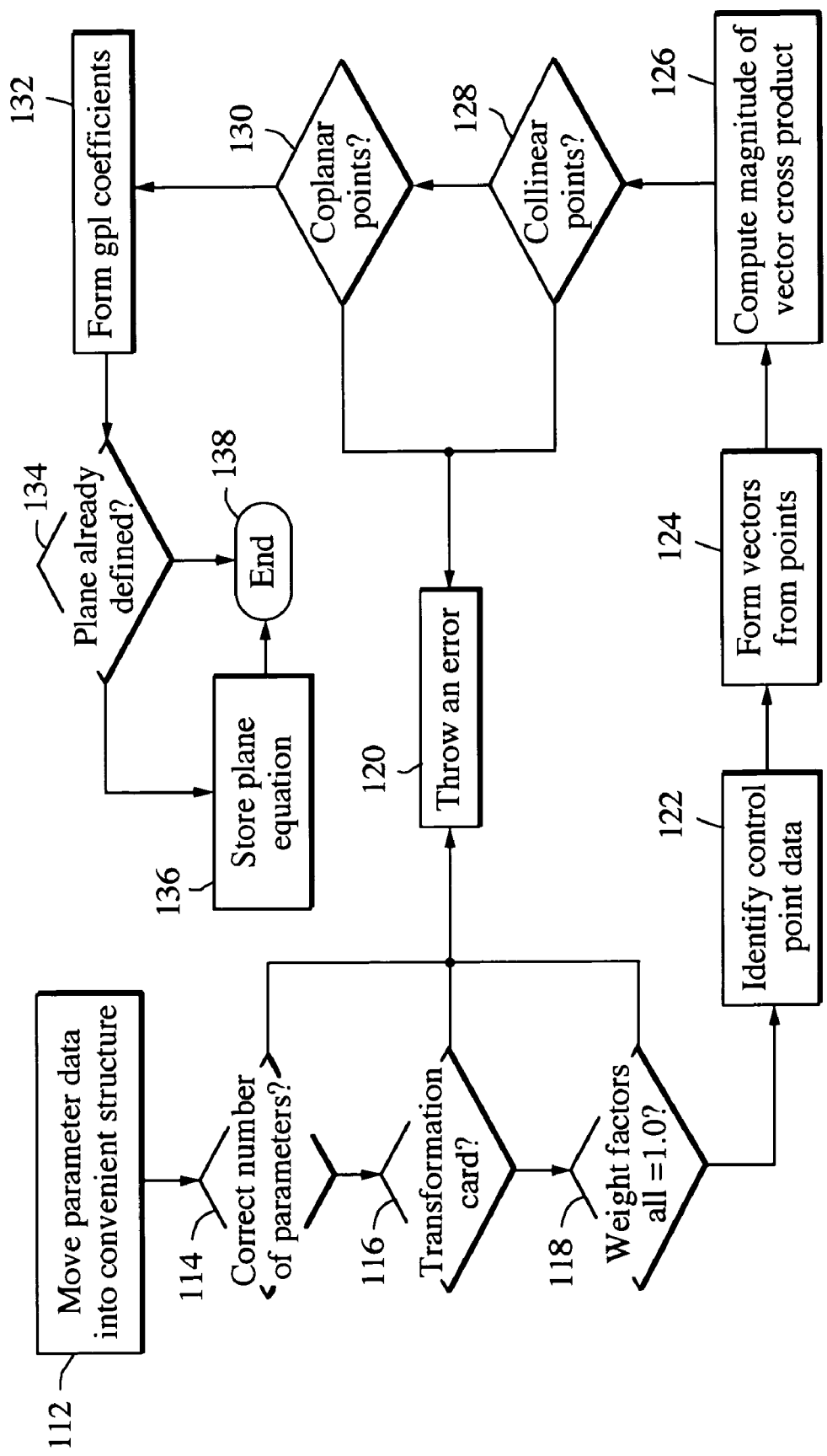
Figure 6C:
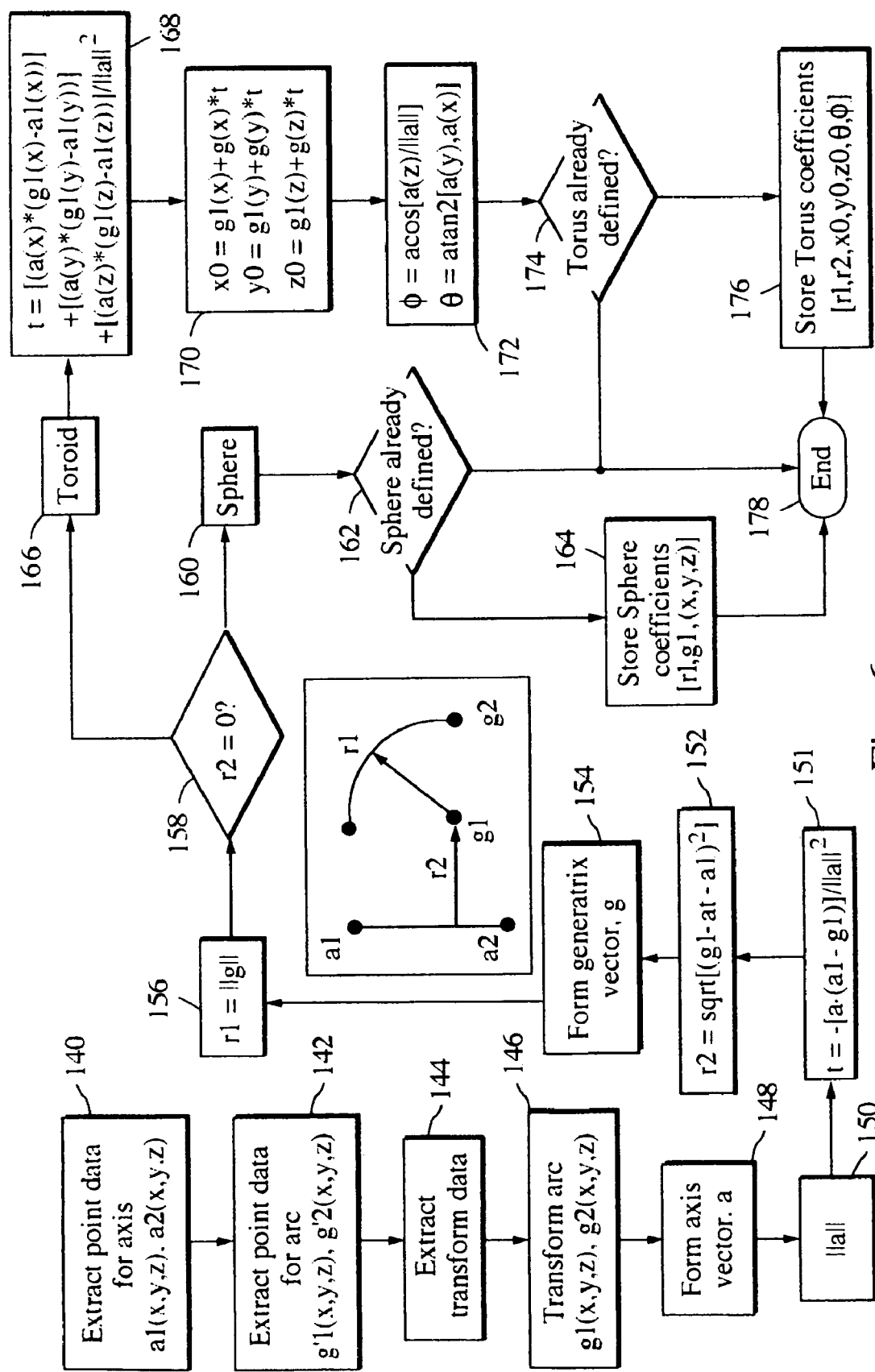
Figure 6D:
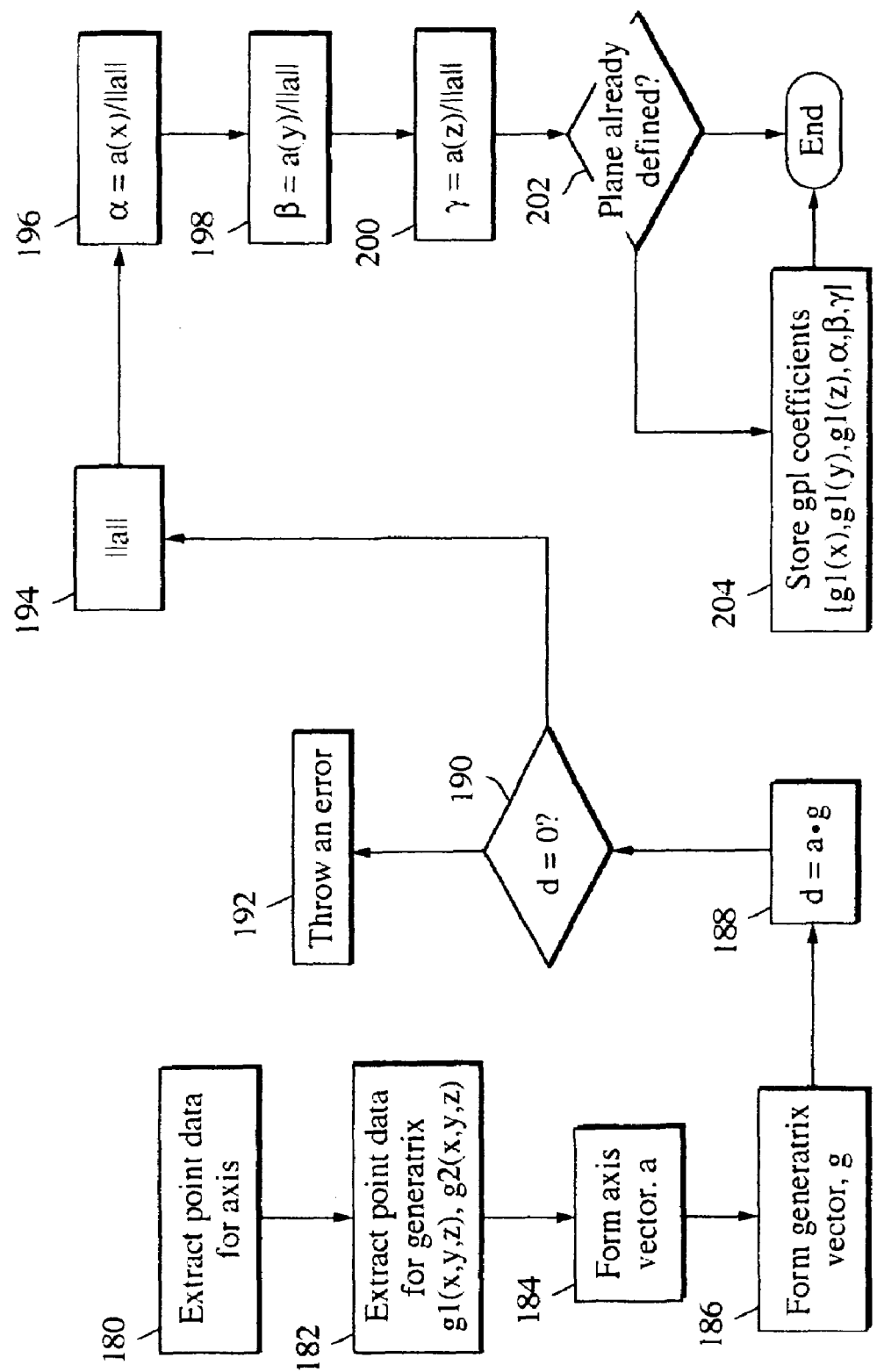
Figure 6E:
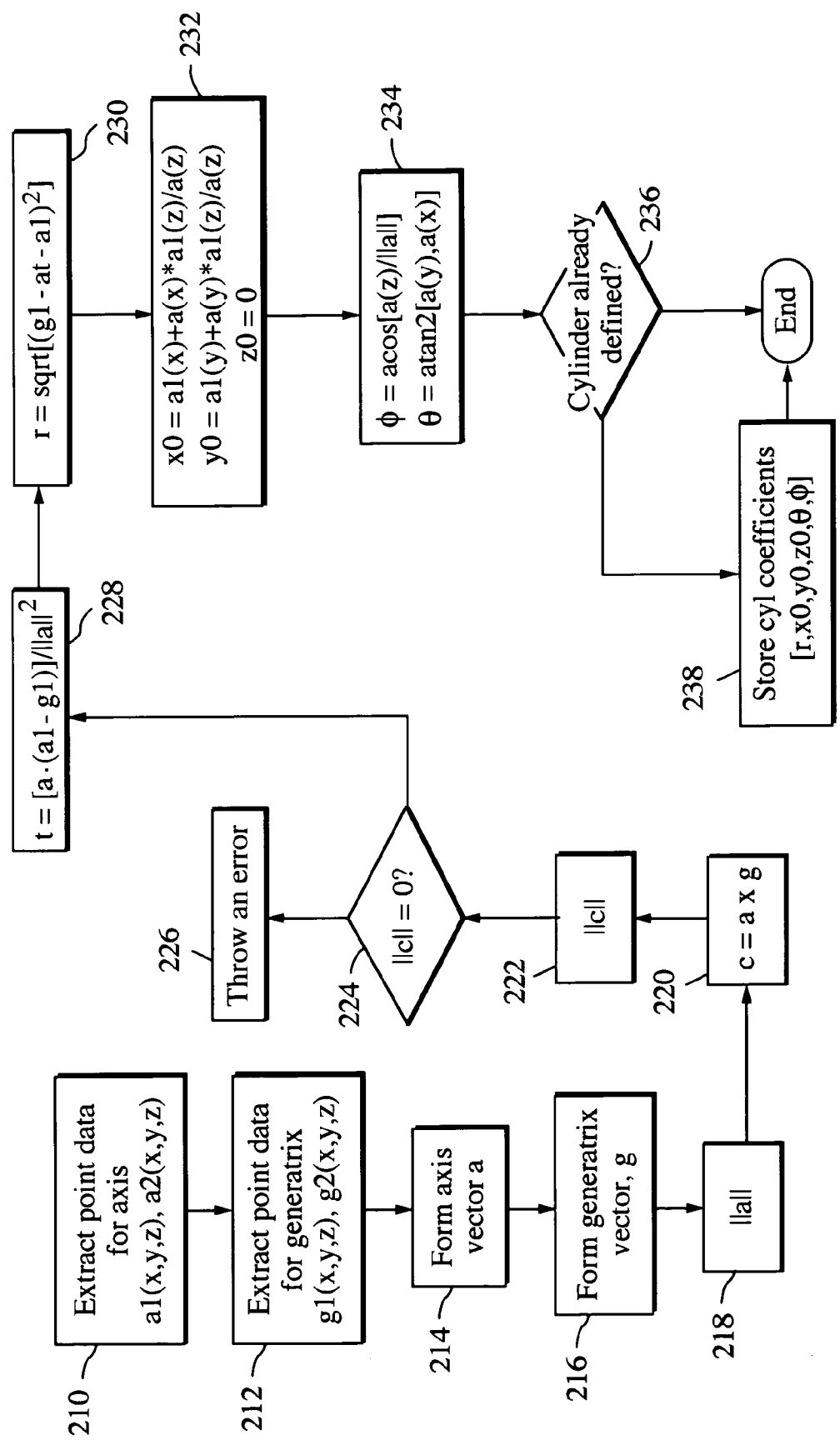
Figure 6F:
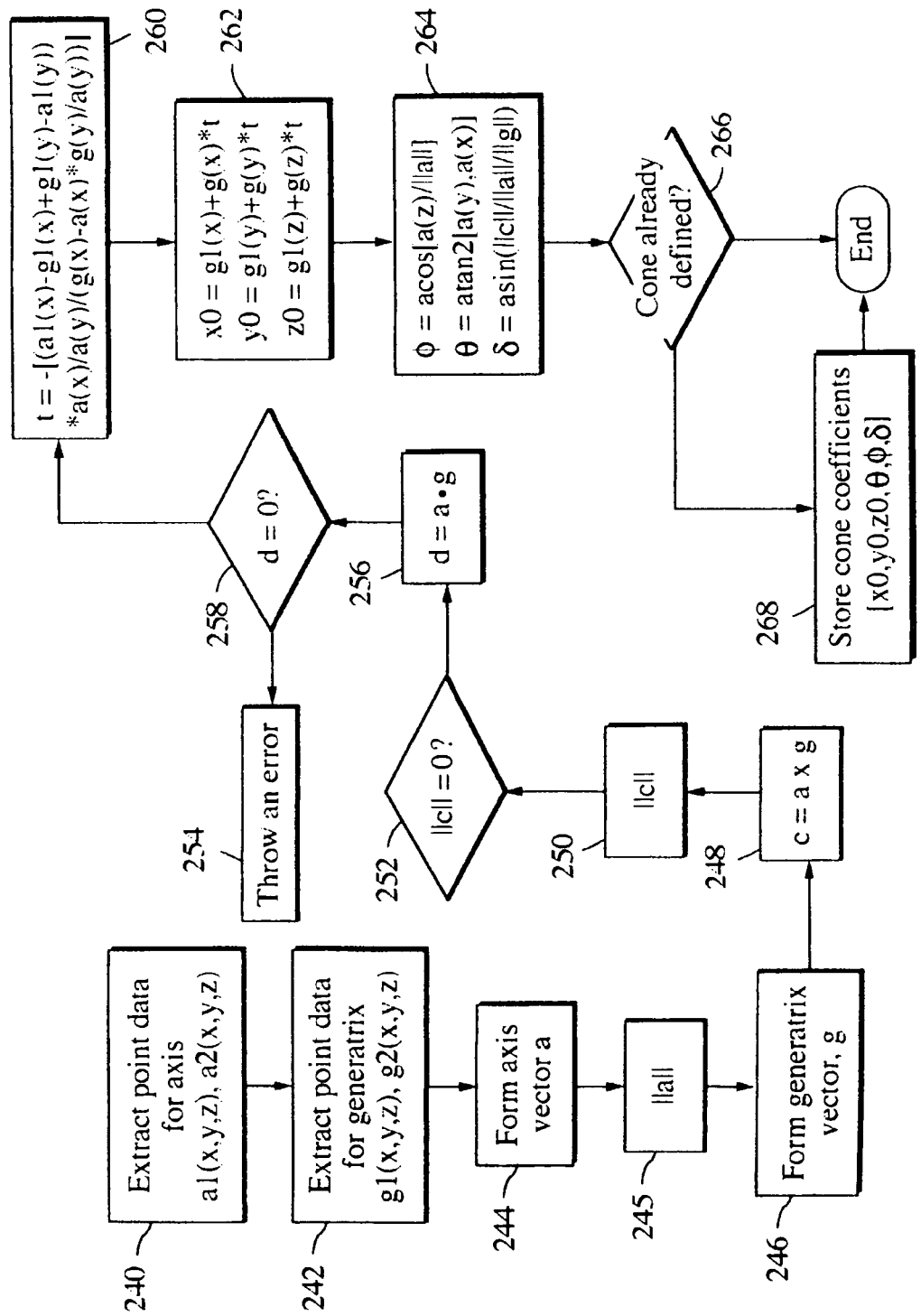

IGESread's topmost level is depicted in FIG. 6a. IGESread begins by opening the user-specified IGES files containing the desired geometry (step 70). The code skips the title and header data (step 72), then reads and stores the entity and parameter data in convenient data structures (steps 74, 76). The algorithm then examines each entity in turn (step 78), determining if the entity is a first order b-spline surface, and if so calling the subroutine Bscalc, which itself is depicted in FIG. 6b. Next the code takes another pass through the data (step 80), this time looking for revolved surfaces—that is, surfaces created by revolving a specified curved or straight line (the generatrix) around a specified axis. During this pass, the algorithm stores data for straight line generatrices (steps 82, 84), and processes generatrices that are arcs (steps 86,88). Arc generatrices form spheres or toroids when revolved; an exemplary process of reconstructing those surfaces is depicted in FIG. 6c. If the revolved surface is neither an arc nor a line it is skipped (step 90). When this pass is complete (step 92), a pass through the list of revolved line segments is made (step 94). Each generatrix is checked in turn to determine whether it is in a common plane with the axis; if not, the lines are skew (step 96), and the revolving procedure will produce a non-standard surface type, so the entity is skipped (step 98). Next the line segments are tested for perpendicularity (step 100); if they are perpendicular, the generatrix defines a plane (step 102), so the plane equations are computed and stored as described in FIG. 6d. If neither perpendicular nor skew, the lines are tested for parallelism (step 104), in which case a cylinder is formed (step 106). FIG. 6e shows the flow for the cylinder extraction code. Finally, any straight-line generatrix that is neither perpendicular, nor parallel, nor skew to the axis will define a cone when revolved (step 108); this portion of the algorithm is depicted in FIG. 6f. Each of the major steps is discussed in greater detail in the following paragraphs. The process iterates until the revolved lines are exhausted (step 110).

First Order B-spline Surfaces

As mentioned above, the Bscalc subroutine shown in FIG. 6b is called on first-order b-spline surfaces. This subroutine moves the parameter data from the first order b-spline surface entity into a convenient data structure (step 112). The algorithm performs a series of checks to determine that the data actually conforms to the expected arrangement for a first order b-spline, namely that it has the correct number of parameters (step 114), that there is no transformation card (step 116), and that all the weight factors are equal to 1.0 (step 118). If any of these things are not true, the algorithm throws an error (step 120) and continues with the next entity (step 78). If this series of tests is passed, the algorithm identifies the control point data for each of four nodes (step 122). Next the algorithm forms three vectors from the first node to each of the other three (step 124). The algorithm computes the cross product of the first two vectors and the magnitude of that vector product (step 126). With this information, the algorithm completes two more tests to demonstrate that the plane is mathematically well formed; it tests to see that all four nodes are not collinear (step 128), and that all four points are coplanar (step 130). If either of these conditions is not met, an error is thrown (step 120), and the algorithm continues with the subsequent entity. The equations for the plane are computed (step 132). If the plane is not already defined (step 134), the subroutine stores the equations for the plane (step 136) and ends (step 138), returning control back to the main body of the code.

Toroids and Spheres

The algorithm for extracting a toroid or spherical surface formed by the revolution of a circular arc about an axis is depicted in FIG. 6c. This extraction begins by storing the point data that defines the axis of revolution for the entity (a1 & a2) (step 140). The arc data (the generatrix) is stored as three points under transformation: the center of the arc and the endpoints of the arc (step 142). Because the desired analytic surface definitions are all unbounded, only the center and one endpoint are required to be specified in the algorithm (g'1 & g'2). Next, the transformation matrix associated with the arc is extracted (step 144), and applied to the g' points, so that the real spatial location of the arc is computed (g1 & g2) (step 146). Next, the vector forming the axis is computed (step 148) and its magnitude is evaluated (step 150). Using this information, the algorithm computes a parameter T (step 151) and then computes the distance from the center of the arc to the axis, which is the major radius, r2 (step 152). The algorithm then forms a vector from g1 to g2 (step 154) (see insert), and computes its length, the minor axis r1 (step 156). The value of r2 constitutes the information necessary to distinguish a torus from a sphere. If the major radius is equal to zero (step 158) (this is actually implemented as being smaller than an arbitrarily small tolerance value), then the construct is a sphere, (step 160) and all the data necessary to describe it have been calculated. The center is at the point g1, the radius is r1. The algorithm checks to make sure that the entity being extracted is novel by comparing it to every previously defined sphere (step 162), and it stores the data only if it is new (step 164). When r2 is greater than zero, the entity is a toroid (step 166). In that case it is necessary to compute the location of the point on the axis of rotation nearest g1 (steps 168, 170), and the azimuth and elevation angles of the axis (step 172). This computation proceeds as follows:

The axis is parameterized via:

$$x=x1+t\times(x1-x2)\ y=y1+t\times(y1-y2)\ z=z1+t\times(z1-z2)$$
where $a1=(x1,y1,z1)$ and $a2=(x2,y2,z2)$ The square of the distance d from $g1=(x3,y3,z3)$ to any point t on the parameterized line is:

$$d^2=(x3-x1-(x1-x2)t)^2+(y3-y1-(y1-y2)t)^2+(z3-z1-(z1-z2)t)^2$$

Evaluating $\partial(d^2)/\partial t=0$, and solving for t gives the parameter corresponding to the minimum distance.

$$t_0 = \frac{[(x_1 - x_2)(x_3 - x_1)] + [(y_1 - y_2)(y_3 - y_1)] + [(z_1 - z_2)(z_3 - z_1)]}{(x_3 - x_1)^2 + (y_3 - y_1)^2 + (z_3 - z_1)^2};$$

and: $x0=x1+(x1-x2)t0$; $y0=y1+(y1-y2)t0$; $z0=z1+(z1-z2)t0$, which are the coordinates of the center of the toroid. The axis angles are computed as $\phi=a\cos[a(z)/\|a\|]$ and $\theta=a\tan 2[a(y),a(x)]$ The algorithm checks to make sure that the entity being extracted is novel by comparing it to every previously defined torus (step 174), stores the data only if it is new (step 176), and finally the algorithm ends, returning control back to the main program (step 178).

Revolved Line Segments—Planes

On the final pass through the identified surfaces consisting of revolved line segments, IGESread begins by identifying and skipping those surfaces created by sweeping a skew line around an axis. Next, the algorithm identifies when the axis and generatrix are orthogonal to one another; when such a line is swept, the resulting surface will be a plane. The algorithm which extracts revolved plane surfaces as shown in FIG. 6d begins by extracting the point data for the two line segments that compose the axis and generatrix (steps 180, 182). The code then forms vectors corresponding to the axis and generatrix (steps 184, 186). The dot product of these two vectors is calculated (step 188). If the dot product is not 0 (step 190), the line segments are not orthogonal, and this portion of the code has been reached in error (step 192). After performing this test, the magnitude of the axis vector is calculated (step 194), and the direction cosines of the vector normal to the surface (which happens to be the axis vector) are calculated (steps 196, 198, 200). Finally, the algorithm compares the newly calculated plane to every previously defined plane to determine if the plane is novel (step 202). If the plane hasn't been previously identified, the data stored consists of the three direction cosines as well as the x, y, z coordinates of the first point of the generatrix (step 204).

Revolved Line Segments—Cylinders

The next possibility for revolved line segments is that the axis and generatrix are parallel; in this case the surface described is a cylinder as shown in FIG. 6e. First the algorithm extracts the point data for the two line segments (steps 210,212), then vectors are formed for each (steps 214,216). Next, the magnitude of the axis vector is evaluated (step 218), and the cross product of the axis and generatrix vectors is computed (step 220). If the magnitude of the vector cross product computed in (step 222) is not zero (step 224) the lines are not parallel, and so an error is generated (step 226). Next the radius of the cylinder is computed using the same technique used to compute the point on the axis closest to the center of an arc, which was developed in the toroid generation portion of IGESread (steps 228, 230). In this case, once the appropriate parameter is computed, the radius itself is calculated instead of the near point coordinates. Then the point at which the axis intersects the z=0 plane is computed (step 232). This is found by using the parameterized form for the axis and solving for x and y when z=0. The last cylinder parameters are computed by determining the azimuthal and elevation angles of the axis, exactly as they were for the toroidal case (step 234). Finally, the cylinder is compared to every previous cylinder (step 236), and stored only if it is new (step 238).

Revolved Line Segments—Cones

Finally, IGESread treats revolved line segments that are neither skew, nor orthogonal, nor parallel. This is the family of cones. The flow diagram in FIG. 6f makes use of many of the same mathematical relationships developed for previously discussed entities. The algorithm begins by extracting the necessary point data (axis a1=(x1,y1,z1), a2=(x2,y2,z2) (step 240), generatrix g1=(x3,y3,z3), g2=(x4,y4,z4)) (step 242), forming vectors for each line segment (steps 244, 245, 246), and testing the dot and cross products to ensure that the desired surface is a cone (step 248, 250, 252, 254, 256, 258). Next the intersection point of the axis and generatrix is computed (step 260, 262); this will be the vertex of the cone. This is done by parameterizing the two lines:

axis: $x=x1+t1\times(x2-x1)$ $y=y1+t1\times(y2-y1)$ $z=z1+t1\times(z2-z1)$ generatrix: $x=x3+t2\times(x4-x3)$ $y=y3+t2\times(y4-y3)$ $z=z3+t2\times(z4-z3)$ and solving for t1 and t2 such that the full set of equations is simultaneously solved by a single (x, y, z) trio. This of course produces 3 equations for two unknowns, and hence is over-specified, but IGESread includes a case structure that will pare down the permutations and eliminate singularities in the case of line segments parallel to an axis. Lastly, the azimuthal and elevation angles of the axis are calculated as outlined previously (step 264), and additionally the angle between the axis and generatrix is calculated: since $\|a\times g\|=\|a\|\,\|g\|\sin\theta$, where $\theta$ is the angle between the vectors a and g, $\sin\theta=\|a\times g\|/\|a\|/\|g\|$. The extracted cone data are compared to all previously specified cones (step 266), and stored only if they are determined to be unique (step 268).

Generate Ambiguity Surfaces

To complete the list of analytic surfaces 62 the computer-implemented algorithm must identify and form all of the ambiguity surfaces 64 required for a well-posed zoning statement. The ambiguity surfaces include those additional surfaces that are necessary to subdivide a part into zones that are not created from the original trimmed surfaces because they are not bounding surfaces. A typical case is shown in FIG. 5, where the slot with rounded ends requires an additional plane near either end 14 to differentiate the various regions of the geometry that are between the planes U5 and U6, and are outside the two circular surfaces U7 and U8 (Recall from background discussion that the surfaces implemented in TART only divide the universe into two pieces, space inside and outside the surface, there is no notion of "space to the upper left of this surface."). These ambiguity surfaces are the planes labeled A1 and A2 in the figure. The algorithm of Ambisurf is a pair-wise comparison of all the surfaces extracted from a part by IGESread. As shown in FIGS. 7a and 7b, a library 270 of surface pairs 272 has been developed that lists the conditions 274 under which the generation of one or more ambiguity surfaces is likely to be necessary. The library also includes formulas for the ambiguity surface 276 needed for differentiation at the intersection of two surfaces. It is expected that this library will grow over time, as experience is gained in rendering complex models using the tools described herein.

Generating Nodal Data

Nodal data necessary to formulate a well-posed zoning statement is generated by Midnode by first providing lists of candidate nodes for the entire domain including a part list 60 and a void space list 61 and then refining those lists to create the list of part nodes 60 and a list of void space nodes 61 shown previously in FIGS. 4b and 4c. There are a variety of ways including mesh-related methods and random node generation for generating the list of candidate nodes and then the individual lists.

Node Generation from Mesh

Techniques for generating nodal data from a mesh include element vertices, element centroids, mid-side nodes, toleranced offset nodes and edge tracing. The mesh information provides not only the location of corner nodes but also how to make up a solid element from a set of corner nodes. The computer can trace a line from one node to another and know that only the material portion of the domain is being traversed (with some caveats). For the purposes of this exemplary process, it is assumed that a mesh such as shown in FIGS. 4b and 4b has been rendered using a commercial meshing tool, and that the data available following the use of that tool is at least, but not limited to nodal coordinates of each vertex of each element (or control volume in the case of a finite difference mesh) and a reference to the nodes that comprise each element. Each method is outlined below.

Element Vertices

The vertices of each element can be used as nodes directly. However, the vertices are frequently coincident with bounding surfaces and hence are a poor choice when seeking to test which side of a surface material the node happens to reside on. In practice, inaccuracy in mesh generation often will lead to the generation of vertices very close to, but on the incorrect side of, the surface it is supposed to be coincident with. This problem may be abated by establishing a tolerance value, measuring the distance between each vertex and every surface, and discarding any point that happens to be closer to any surface than the tolerance value. This approach has been demonstrated to work in practice. However, thin regions of material that happen to be meshed by only one layer of elements frequently elude this method since all such vertices may be discarded. This difficulty led to the use of centroid and mid-side nodes as additional nodes.

Element Centroids

Determining the element centroid by computing the average value of each of the coordinates of the vertices is one way to get nodal data that is typically not coincident with a surface and may be located in a thin region. However, in the case of an element that describes a region outside and adjacent to a concave surface the centroid of a thin element can end up inside the concavity. This conflict can be prevented by ascertaining whether three vertices of an element are located on a single surface, and discarding the centroid of such an element.

Mid-side Nodes

Another method for locating nodes in thin regions is to calculate the mean coordinate locations of each pair of adjacent vertices to form a mid-node. This method generates far more nodes than the centroid approach, and thus results in a more comprehensive representation of the geometry. A test is performed to determine whether a pair vertices both lie on a common surface; such points are discarded.

Toleranced Offset Nodes

Even using centroids and mid-edge nodes, some regions may not be captured by the nodal data. In this case, the addition of nodes on each element edge located a distance slightly larger than the tolerance distance (mentioned above) away from each vertex that defines the edge has proven effective to capture these regions.

Edge Tracing

In highly complex geometries the node density achieved using the previous four methods may not be sufficient to characterize the part. In these cases the generation of additional nodes by tracing along each edge of each element, counting the number of surface crossings encountered, and generating an additional node for each one has proven effective to characterize the part.

Edge Tracing has been implemented in an exemplary algorithm by comparing the element vertices at either end of an edge, in turn, to each surface in the geometry, determining which side of the surface the vertex is on. Then the number of surface crossings is computed by differencing the nodal zoning statements generated in the previous two operations. Finally, the edge is successively bisected with respect to one vertex until only one surface crossing is computed, and that location is used to generate a node. This process is recursively employed to generate a node corresponding to each surface crossing. Occasionally a concave surface can be crossed twice by the edge of a coarse mesh element. In this circumstance discarding any prospective node that lies on the opposite side of any surface with respect to both vertices has been effective.

Random Node Generation

Some CAD or geometrical modeling implementations support the ability to determine whether a given coordinate location is in material or the space surrounding or internal to the material region. If the part of interest exists in such a context, it is not necessary to formally mesh the part; merely generating a sufficiently dense distribution of random nodes over a domain somewhat larger than the part will provide the necessary data Using the meshing approach, it is necessary to separately mesh the material of the part, and the void space within and around the part; correspondingly, as random nodes are generated they need to be sorted into two groups: void nodes and material nodes. As in the case of meshing, it is prudent to discard any random nodes which happen to be generated within a tolerance distance of any surface, in order to avoid ambiguity due to inaccuracies that may develop during the pointwise interrogation of the model. A uniform distribution in each coordinate direction will generate a suitable array of test points, but if data exists as to the complexity of various regions of the model, some benefit can be realized by increasing the number density of test points generated in those locales.

Formulating a Zoning Statement

Once complete lists of the analytic surfaces 62 and the nodal data 60 and 61 for the part are available, the computer-implemented process can formulate a well-posed zoning statement. Essentially, the algorithm compiles an ordered binary list for each node that states the relationship between the node and each of the surfaces from the surface list. Each of these lists is referred to herein as a "nodal zoning statement." Recall that analytic surfaces divide space into two regions, the "interior" and "exterior" regions. The binary list identifies the corresponding node as lying "inside" or "outside", e.g. to left or right, above or below, each surface on the list using a series of "the" and "false" statements, or "1" and "0" in binary terms. As each successive node is treated, it is compared to all previously calculated binary lists for earlier nodes. If the list already exists, the node is ignored. If not, the binary list for that node is appended to a list comprising all previous unique nodes; the table of lists is a well-posed zoning statement for the part.

As shown in FIG. 8a, the computer-implemented Midnode algorithm is a nested loop structure in which each node 279 in FIG. 8b is selected in turn and compared to every surface from the surface list before proceeding to the subsequent node. More specifically, the first node on the list is selected (step 280) and the first surface on the list is selected (step 282). The distance from the node to the surface is computed (step 284) in order to determine if the distance is less than a pre-defined tolerance value (suitably $1 \times 10^{-5}$ distance units) (step 286). If true, the node is discarded in order to avoid any potential inaccuracy that would result in a miscalculation of which side of that surface the point was actually meant to reside on. The algorithm checks to determine whether any more nodes are on the list (step 288) and, if yes, increments the node (step 290) and repeats the loop. If the node is not too close to the surface, the algorithm computes the "surface sense" with respect to the node (step 292). Since every analytic surface divides all of space into two regions, we arbitrarily construe one of these sub-regions of space to constitute the "inside" of the surface, and the other the "outside". The algorithm determines whether the node is "inside" the surface (step 294) and either appends a "true" to the nodal zoning statement (step 296) or a "false" (step 298). If there are any more surfaces on the list (step 300), the algorithm increments the surface (step 302) and computes the distance (step 284). Using the knowledge of the position of a node with regard to every surface in the model, a nodal zoning statement 67 is constructed, this is a single row truth table, ordered by surface number, with a "true" ("+") ("1") entry corresponding to every surface the node is "inside", and a "false" ("−") ("0") entry for each surface the node is "outside" as shown in FIG. 8c.

When a nodal zoning statement 67 has been successfully completed for a node, that zoning statement is compared to the previously computed zoning statements for all previous nodes (step 304). If the newly computed zoning statement is truly novel, it is appended to the list of unique nodal zoning statements (step 306). When all nodes have been processed in this fashion, the complete list of unique nodal zoning statements can be said to constitute a complete zoning statement 68 for the part (step 308). As shown in FIG. 8b, each node that lies far enough away from a surface is labeled as M1, M2, . . . M6. Nodes that have the same nodal zoning statement are denoted in this figure as having the same label.

Once the truth tables (zoning statements) T for the part and F for any void spaces have been computed, it is also frequently helpful (though not necessary for this process) to pre-compute the truth table entries which are absolutely necessary in order for the solution to be well-posed (step 309). This is done by creating a mandatory table M in which all the entries are initially false. The rows of the material truth table T are compared one-by-one to each row of the void truth table F. If ever a pair of such rows is found to differ by only one entry, it is certain that that entry must always be maintained in any trial solution for the solution to be well-posed. Accordingly, that entry in the M table is set to true. If ever such an entry were deleted, there would be nothing to distinguish a portion of the material from some portion of the void, hence the two must overlap, which is not physically possible.

It is possible to use the zoning statement produced by the Midnode algorithm to construct a combinatorial geometry statement of the part, however, in practice it has been found that an optimized zoning statement for a part can typically provide two orders of magnitude improvement in runtime when performing radiation transport analysis. Therefore, the final step of this process suggests the use of an optimization routine on the part's zoning statement (step 310).

Optimizing Zoning Statement

Optimization entails eliminating references to redundant surfaces and merging zones in the statement and is accomplished by operating on the truth table (the base zoning statement 68 shown in FIG. 8c) that relates the position of all the nodes on both the part and void space lists to the analytic surfaces (both boundary and ambiguity surfaces) that comprise the entity. The optimization process, being a special formulation of the general binary minimization problem, may take any number of forms, but the current best practice is a comprehensive way of iteratively subdividing the domain of the part (e.g. the "positive-valued" truth table), solving each of the sufficiently small pieces independently using a genetic algorithm, regressing back through the decomposition process and repeating the solution procedure with each reunited subdomain until the entire geometry has been reunited. A full discussion of this algorithm is provided in co-pending U.S. patent application entitled "Method for Solving the Binary Minimization Problem and a Variant Thereof", filed on May 4, 2004, which is hereby incorporated by reference.

More specifically, a "Break" routine iteratively bisects the domains (truth table) into smaller and smaller sub-domains (sub-tables). A "Zoner" routine operates on the lowest level sub-tables, computing optimized zoning statements for each. A "Rebuild" routine iteratively recombines bisected sub-tables starting at the lowest level and working backwards. Using the zoning statements from the lower level sub-tables, Rebuild further refines the zoning at the next higher level. When complete, Rebuild produces a single truth table representing the optimized zoning statement for the entire problem. This procedure not only out-performs the generic solution procedure as applied to the whole geometry (simultaneously) in terms of the solution time, it typically arrives at a more optimal solution as well. This process has an added advantage of providing a working solution at every uniting iteration following the solution of all the smallest subdomains. Thus for any geometries that are so complicated that the final uniting steps are too time-consuming to bother with, a working solution can be gleaned from the output at any intervening time.

Break

At the beginning of the bisection process it is expected that a complete set of input data will be supplied by the translation algorithm. This input data should include at least two truth tables: the first represents the explicit known input set that results in [true] valued output, the second represents the explicit known input set that results in [false] valued output. In geometrical terms, these can be construed as the material and void truth tables, respectively. These tables are not required to be complete; that is, together they do not have to represent every possible Boolean combination of the columnar input values. At least in the case of the geometrical formulation, certain combinations of inputs will not be possible; therefore it would limit the framework of this solution procedure to require exhaustively complete tables. The input may also include the mandatory truth tables. These mandatory entries can also be provided to the bisection procedure, which can reformulate them as the problem is bisected, and pass the required information down and back up the tree as the algorithm proceeds.

The input may also include any a priori ranking of columns (surfaces) for selection as bisectors. Logical bisection candidates may be calculated as the algorithm proceeds, so there is no requirement for these to be available in the input. The bisecting column maybe selected using Node Weighted Surface Selection, Area Weighted Surface Selection, Surface Selection by Type or Surface Selection by Parameter. The most robust implementation will use several of these criteria simultaneously. This will allow the most optimal surfaces to be chosen early in the process, which has been demonstrated to lead to highly optimized solutions in a minimum of computation time.

Node Weighted Surface Selection

When the truth table data has been constructed using a finite element discretization of the original geometry, a sizable fraction of node points will lie on the bounding surfaces of the geometry. The surfaces that are the most populated with nodes are selected as the bisection column.

Area Weighted Surface Selection

In a geometry formulation where a finite element discretization is not available or is too expensive to calculate, the area of each bounded external surface of the part maybe computed. Attractive bisection surfaces are those that bound large external surface areas.

Surface Selection by Surface Type

Frequently the unbounded surfaces that make up a geometrical part are of many different types, e.g. sphere, cylinder, plane. A priori knowledge of the part's geometry can determine which types of surfaces will make good bisection surfaces.

Surface Selection by Surface Parameter

A parameter or a set of parameters can be used to differentiate between good candidates and bad. Use of the radius or the angular alignment of a surface entity are particularly valuable parameters on which to base selection of bisection surfaces.

The bisection process starts by selecting a truth table T for the part, its complement F for the void space(s), the associated mandatory table M and a bisection column. The computer then produces sub-tables for the T table for the bisection column and their complements. The M table is split into sub-tables to correspond to the division of the true sub-tables. Finally, the computer simplifies the T sub-tables, the complements and the M sub-tables. All of the sub-tables are stored and the process repeated recursively for each T sub-table until they are sufficiently small.

Figure 9A:
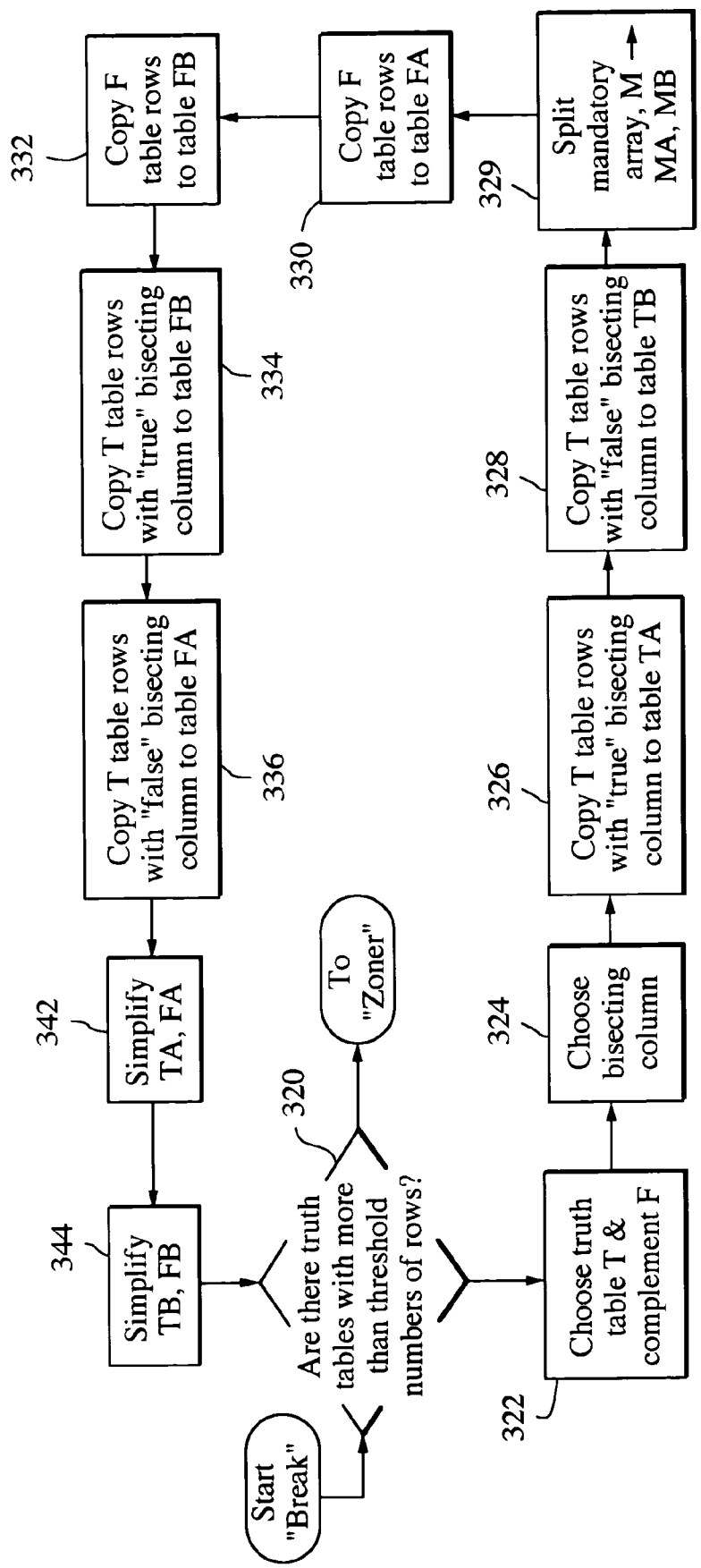
FIGS. 9a through 9d illustrate the steps for optimizing the initial zoning statement using a particular binary minimization algorithm.
Figure 9B:
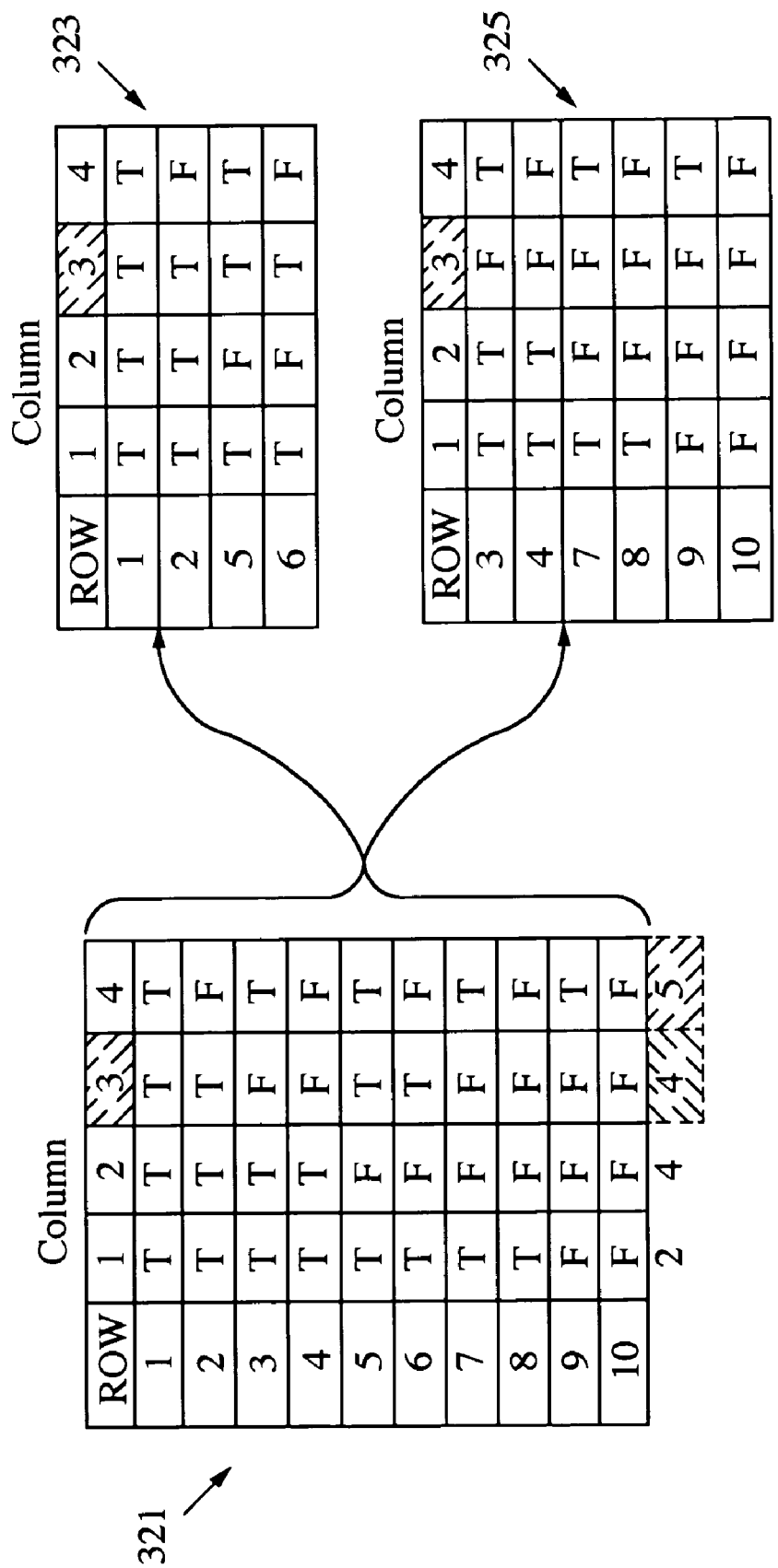

A flowchart and graphic representation of the bisection process are shown in FIGS. 9a and 9b. The process is initiated by determining whether there are any remaining truth tables with more than a threshold number of rows (step 320). The threshold can be set arbitrarily, but a suitable value of 15 has been chosen by trial and error. If there are any such tables, the process selects a truth table T 321 and its complement F (step 322) and selects a bisecting column for truth table T (step 324).

Once the bisecting column has been chosen, splitting the larger truth table in two is performed simply by building two new smaller sub-tables 323, 325, one is a copy of each of the rows from the original table that has [true] as the entry for the chosen column, TA (step 326). The other sub-table gets copies of all of the rows that read [false] in the chosen column, TB (step 328). This operation is performed on the [true] valued truth table. Additionally, the array of mandatory entries, M (which has rows and columns corresponding one-for-one with the [true] truth table) can be split up into two pieces as well, each row is assigned to a sub-table corresponding to either the [true], MA, or [false], MB, side of the bisecting column, depending on whether the corresponding row of the truth table had a [true] or [false] value in that column (step 329). Two copies are made of the [false] valued truth table (FA, FB) (steps 330, 332) and one copy is assigned to each half of the [true] valued truth table. Next, additional information is appended to each of the two new copies (steps 334, 336); each sub-table has the rows of the opposite half of the [true] valued truth table appended to it (FA=F+TB; FB=F+TA). This ensures, as the solution proceeds, that the two lower level solutions will not overlap under any condition.

At every step of the bisection routine, copies of the truth sub-tables are stored for later use during reconstitution. In the exemplary optimization routine the truth sub-tables are simplified at each step (steps 342,344) by eliminating identical rows, eliminating any columns that are not necessary to represent the part and finally eliminating any identical rows created by culling the columns. At every step an ordered list of the columns and rows (referenced to the original truth tables) which persist in the sub-table at that point in the process is stored. In addition, some sort of invertible path structure is stored as the recursive bisection takes place, so that a map can be constructed which will allow the appropriate pairs of files to be reunited in the appropriate order leading all the way back to the original truth table construct.

Finally when the bisection process has been repeated recursively to the point where all remaining [true] valued truth sub-tables are smaller than some threshold, i.e. step 320 is false, the desired optimization routine ("Zoner") can applied at this lowest level. Because these low level optimizations are independent of one another they may be implemented as parallel processes if desired. In the exemplary implementation of this invention a binary minimization algorithm incorporating a genetic algorithm is used to optimize the truth tables, but any optimization routine may be successfully used in this process.

Zoner

The binary minimization algorithm embodied in "Zoner" solves the problem of representing each sub-table, which represents a sub-domain of the part, as a simplified trinary zoning statement with the fewest zones and analytic surfaces required to isolate the part from the void space. In the current embodiment this is accomplished for each truth sub-table by forming a seed organism using a trinary representation, creating a pool of initial organisms from the seed, breeding the pool until the population stabilizes and then selecting the highest scoring trinary zoning statement. The proven theory is that the children of the parents will be better organisms and score higher. This genetic algorithm will converge to the optimized zoning statement much faster than a random or exhaustive search.

Figure 9C:
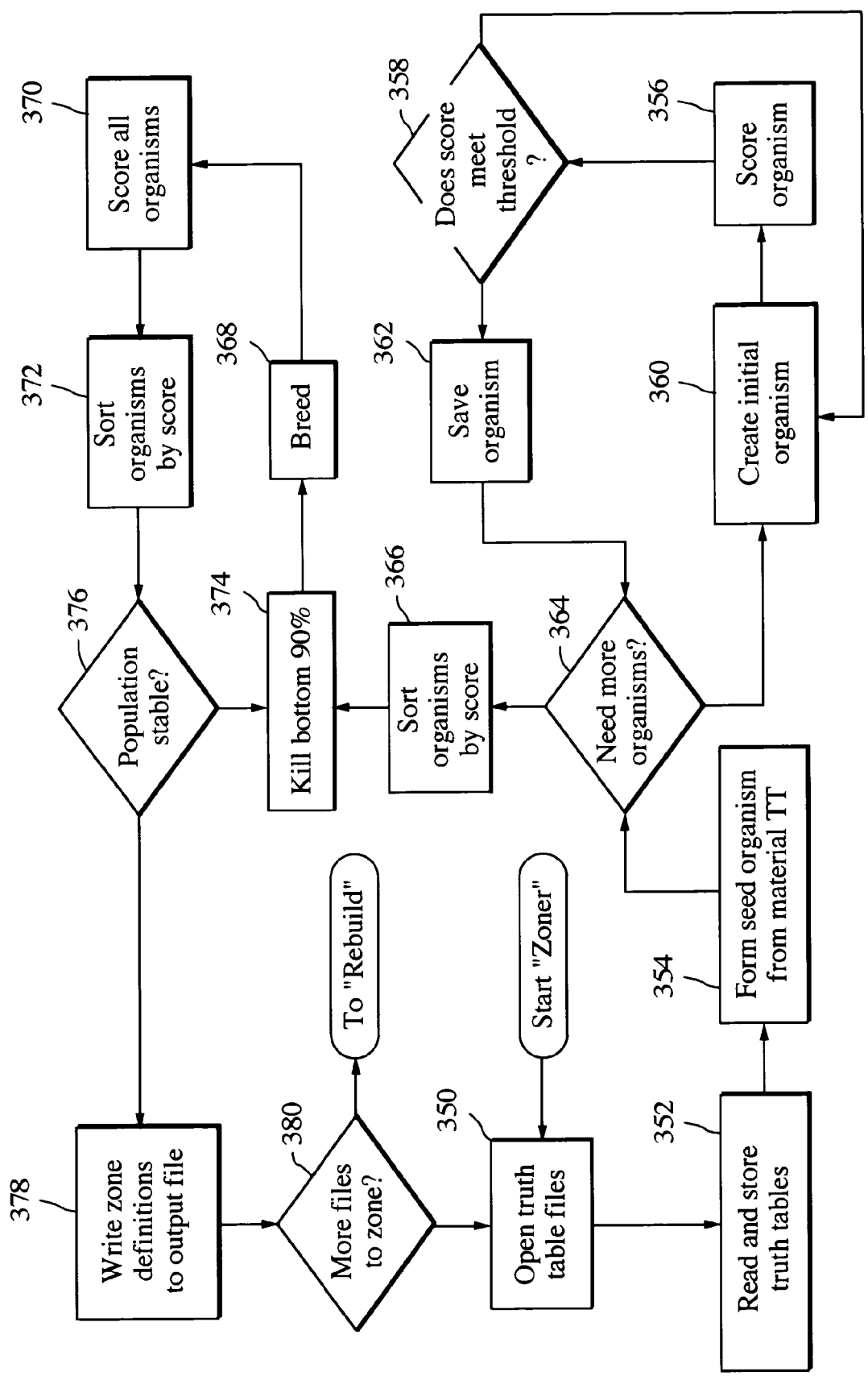

As shown in FIG. 9c, "Zoner" opens truth table files (step 350), reads in and stores the truth sub-table files (step 352) and then enters a loop which will create an initial population of organisms, beginning with one formed directly from the material truth table (step 354). The seed organism is formed by mapping each T table entry to a "1" and each false table entry to a "−1". An initial pool of organisms is created by duplicating the seed and changing some of the +1, −1 values to 0s. This can be done randomly, all but mandatory entries in a given row, or for different entries in adjacent rows. As the pool of organisms totaling, for example, one tenth the size of the entire eventual population is formed, each organism is scored on the fly (step 356). If an organism would permit an entry from the F table (e.g. identify a point in void space as the part) it is assigned a score of zero. Otherwise the score is inversely proportion to the product of the number of unique rows in the organism and the number of non-zero entries in those unique rows. Thus, an organism that has few rows and many zeros without admitting a false entry has a very high score. Any organism that fails to meet a threshold score (step 358) is not saved, and a replacement is immediately generated (step 360).

When a sufficient quantity of organisms has been created and saved (steps 362, 364), the organisms are sorted (using, for example, the common sort routine, Heapsort) by score (step 366). In later passes through the loop, the bottom 90% of the organisms are destroyed (step 374), but the first time through the loop, only 10% of the overall pool has been created, so no organisms are destroyed. The pool is then filled out by the breeding procedures (step 368) such as asexual binary reproduction with various mutation techniques. At this point the algorithm commences its main task: scoring (step 370), ranking (step 372), killing (step 374) and breeding (step 368) repeatedly, until the population demonstrates stability (step 376). "Population stability" is defined as a combination of the lack of variation in the score of the survivors, and the repetition of the same top score in several successive generations. Stability is guaranteed to be achieved with a successful result, however, if the threshold was set too large it may or may not be the case that the result encountered is reasonably approaching the optimal solution. Once stabilized, Zoner writes the zone definitions to an output file (step 378) and determines whether there are more files to zone (step 380).

Rebuild

Solutions to each miniature optimization problem can be stated in a truth-table analog format that serves to simplify the bookkeeping when two sub-tables are reunited. In this form, the row-column format is preserved with one-to-one correspondence, but the entries in the table are trinary data corresponding to [true], [n/a], and [false], e.g. (1,0,−1) respectively. In order to preserve the number of rows in an optimized solution, multiple copies of any term that comprises a solution for more than one row are made in the solution table. This doesn't mean that the solution actually contains as many terms as there are rows in the truth table, as any duplicate solution rows actually are representative of only a single solution term.

Reuniting two lower level sub-tables is not necessary if intermediate tables are stored during the bisection process. Each of these higher level sub-tables is a fresh problem statement in it own right, but using the two solution tables for the lower level sub-tables will yield a solution for the higher level problem, but it is now possible to further optimize the solution at the higher level. The solution tables are combined by interleaving the solution rows into their appropriate positions (recalling that the higher level truth table was broken in two by dividing rows into two groups, and that each solution row corresponds directly to a lower level truth table row) and filling any missing columns with the [n/a] trinary correlate (0). Using this new solution table as a starting point, optimization is typically greatly simplified, frequently by orders of magnitude in computation time.

The solution and solution reunification procedure is applied to successively higher levels of sub-tables, replicating the bisection procedure in reverse. For very complicated problems it may occur that as the sub-tables get increasingly large the payoff in terms of optimization isn't worth the increased solution time. This solution procedure is quite amenable to premature termination, as any intermediate solution is an effective solution (and often a highly optimized solution) of the overall problem. It is only necessary in this case to combine all of the highest level solution tables according to the above procedure, and an effective solution can be established. The reunification and higher level solution process is also independent from pair to pair, so it is also quite simple to implement as a parallel algorithm if desired.

Figure 9D:
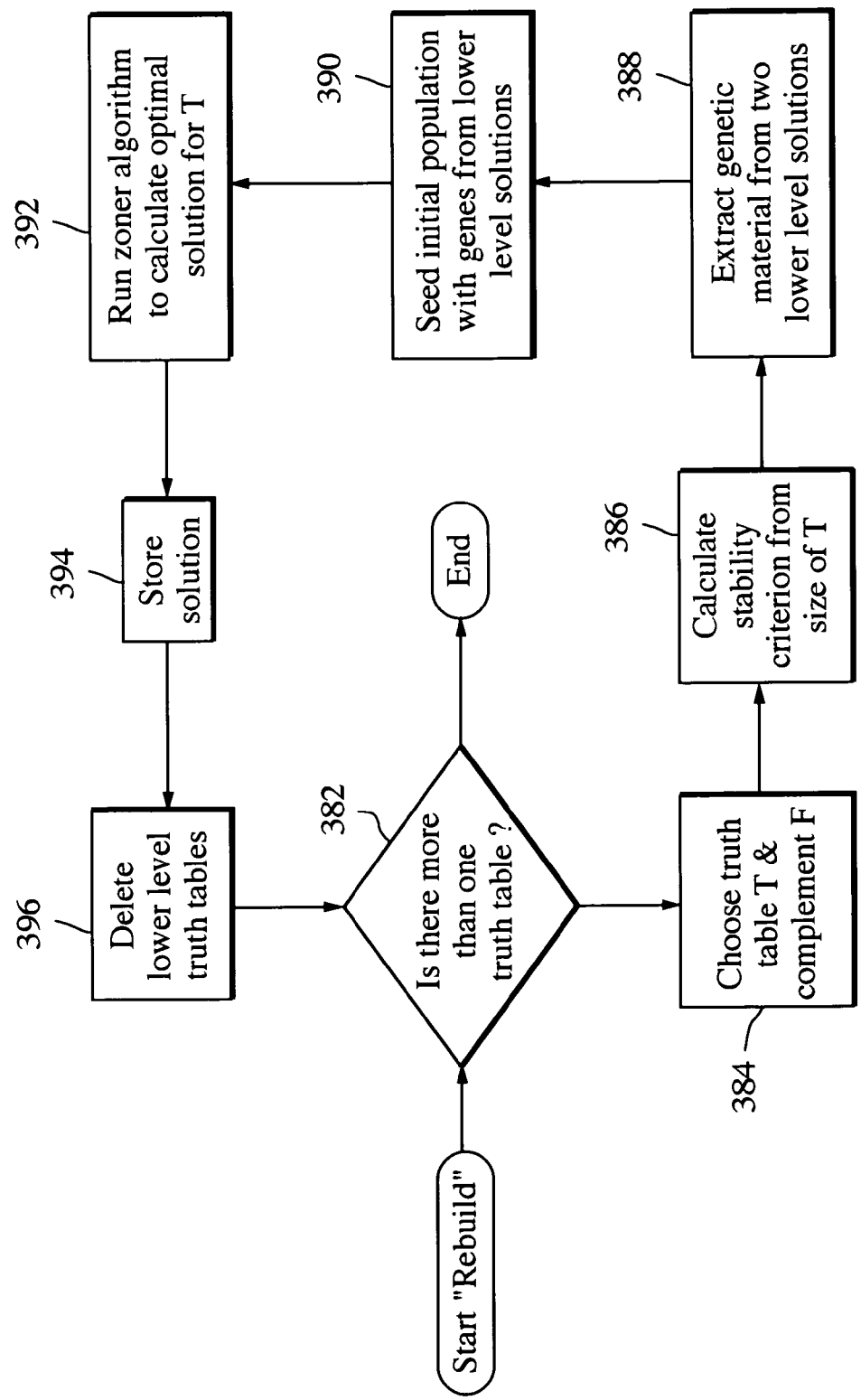

The exemplary algorithm that implements the above logic is presented in FIG. 9d. In this procedure, the loop structure begins with a tree of sub-tables produced by iterative bisection and simplification, where only the lowest levels of each branch have been solved. The procedure terminates when all the sub-tables have been collected by binary recombination, and an overall solution has been calculated (step 382). With each pass through the loop, a pair of complementary sub-tables (T and F) from the lowest remaining unsolved level is chosen (step 384). It has been found that as the size of T increases, the length of time it takes to compute new solutions increases dramatically. Furthermore, it has been found that the likelihood of substantive improvements in the solution decreases with the size of T when lower level solutions are provided. Therefore, the current implementation decreases the tolerance value for solution stability as T increases, so that inordinate amounts of time aren't spent when improvements are unlikely and costly to compute (step 386).

The solution procedure begins by identifying the two lower level solution tables (from the solutions for TA and TB) and extracting the genetic information from those solutions, reformulating it to meet the requirements of the higher level sub-table by adding zeros within each row corresponding to any eliminated columns, and interleaving the rows of the solutions to match T (step 388). The genes of this tentative solution are used to create an organism to seed the population of the genetic organisms representing the solution for T (step 390). Next, the Zoner algorithm is used in concert with the pre-determined tolerance value and the trial solutions to genetically improve the proposed solution (step 392). When the tolerance value is achieved, the solution is stored (step 394), and the lower level truth tables are deleted or flagged as solved (step 396). When the solution is complete for T, the loop continues by identifying the subsequent lowest level unsolved sub-table.

EXAMPLE

ProE CAD Model to TART Format

Figure 10:
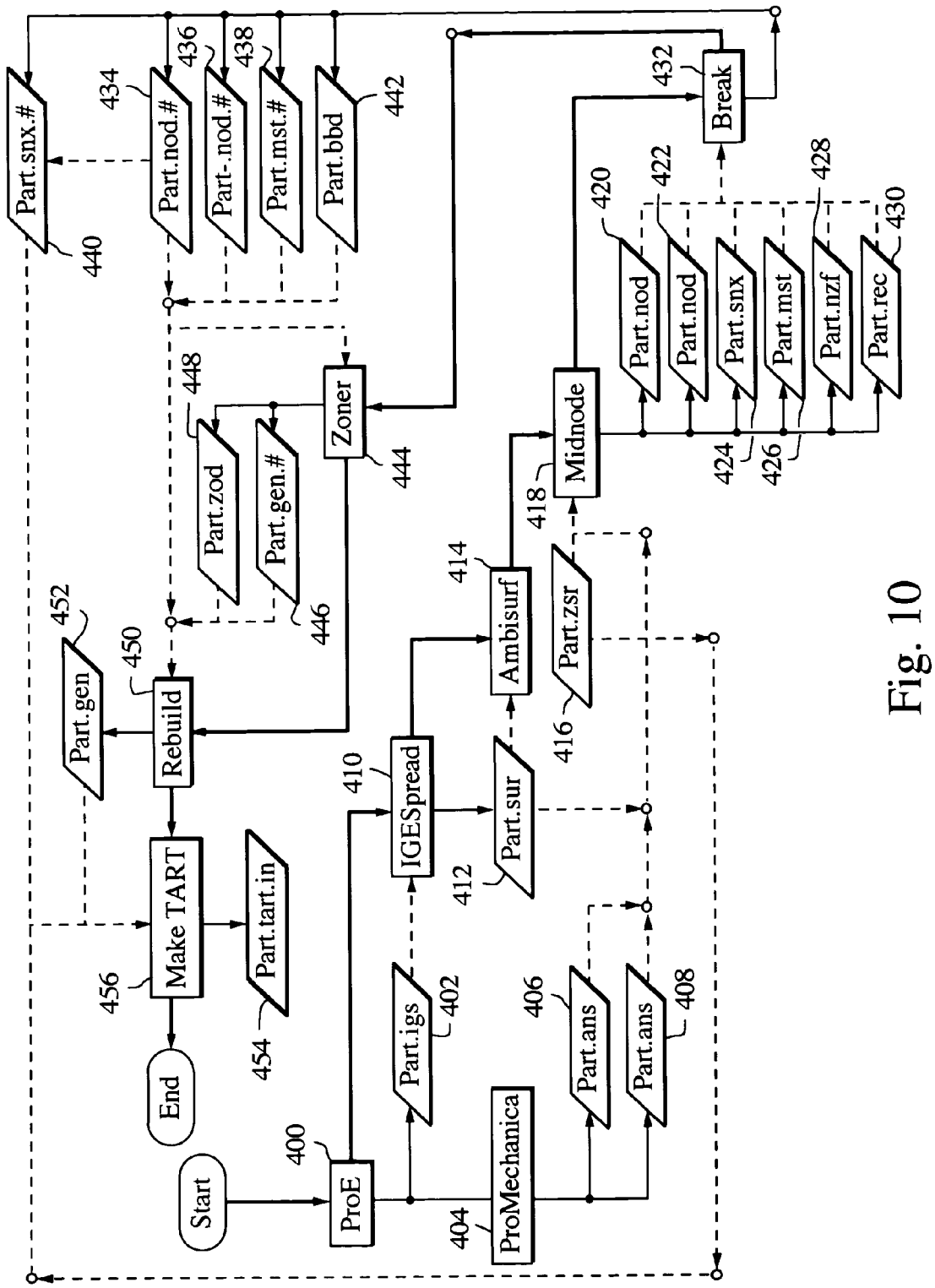
FIG. 10 is a detailed flowchart of one embodiment of the automated translation process.

The exemplary process of FIG. 10 is one instantiation of a complete translation scheme to produce combinatorial geometry in TART format from ProE CAD part data The first step is to extract from ProE (step 400) the IGES file (Part.igs) 402 representing the part geometry. This data includes the trimmed bounding surface data for the part. The ProMechanica package of ProE can be used to discretize the part and the space around the part (step 404). These two meshes are stored in ANSYS format as Part.ans 406 and Part-.ans 408 respectively.

The next step is to run the IGESread routine (step 410). This accepts as input the IGES file part.igs, and produces as output the boundary surface primitives for the part in file part.sur 412. The Ambisurf routine is executed (414) to compute the candidate ambiguity surface primitives. The output file Part.zsr 416 is a combined listing of boundary and ambiguity surface primitives.

The Midnode routine transforms the problem from one of geometry to one stated strictly in terms of logic (step 418). Each node in the part.ans file is compared to each surface in the Part.zsr file, and a truth table row is constructed that represents the position of the node (in a binary sense) with respect to all the surfaces; recall that each bounding surface divides all of space into a positive region (true), and a negative region (false). The truth table merely collects the truth row information for each mesh point. Midnode also computes additional points from the mesh data, and collects them in the truth table as well. This process is repeated with the mesh in part-.ans for the void space around and internal to the part. Next, midnode simplifies the truth tables by eliminating duplicate rows and surfaces that are not absolutely necessary to differentiate material region from void regions. These simplified truth tables are stored in part.nod 420 and part-.nod 422. Finally, Midnode writes files with additional data: part.snx 424 lists the ordered surface indices from part.sur which are used in the simplified truth tables, part.mst 426 is a material truth table analog which shows which truth table entries can be precomputed to be necessary to differentiate part from void, part.nzf 428 is created to carry information about how many part.nod files there are (at this point that number is the default, 1), and part.rec 430 contains information about which surfaces are good candidates for the bisection operation.

The Break routine performs iterative bisection of the problem (step 432), simplifying truth tables and generating two sets of part.nod 434, part-.nod 436, part.mst 438 and part.snx 440 files at each step. As the bisection proceeds, a part.bbd file 442 is continually updated to keep track of the bisection tree throughout the process. Also, the part.nzf file is continually updated with the total number of files generated for bookkeeping.

The Zoner code operates on all of the lowest level members of the file tree, computing minimized zoning statements (in trinary logic) for each (step 444). These are the part.gen.# files 446. Additionally, a part.zod file 448 is generated and updated at each iteration, which includes information concerning which files represent lowest level members of the file tree.

Next, the Rebuild routine iteratively recombines bisected truth tables starting at the lowest level and working backwards (step 450). Using the zoning statements from the lower level entities, Rebuild further refines the zoning at the next higher level. When complete, Rebuild produces a single Part.gen file 452 representing the computed minimized zoning statement for the entire problem.

The last step in the exemplary procedure from FIG. 10 is the routine MakeTART, which reintroduces the geometric representation of the problem, combining the surface primitive information (part.zsr) with the computed zoning statement (part.gen) to form a working input deck Part.tart.in file 454 for the TART code (456).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A computer implemented system, comprising:
   a CAD system that generates a CAD model for an assembly including at least one mechanical part, said CAD model producing a list of trimmed surfaces for each said part that form a bounded analytic representation of a high order geometry surface in space;
   a software tool that discretizes the part to produce a first list of nodes that lie on the part and a second list of nodes that lie in a void space;
   a translation program that translates the lists of trimmed surfaces and nodes into a surface-based combinatorial geometry (SBCG) format including a list of analytic surfaces having bounding surfaces and ambiguity surfaces and a well-posed zoning statement and optimizing the well-posed zoning statement to eliminate redundant analytic surfaces and merge zones subject to a constraint that the zoning statement remain well-posed; and
   a ray-tracing program that operates on data in the SBCG format for said at least one mechanical part to analyze non-mechanical properties of the assembly.

2. The computer implemented system of claim 1, wherein the translation program optimizes the welt-posed zoning statement with a binary minimization algorithm.

3. The computer implemented system of claim 2, wherein binary minimization comprises:
   Iteratively subdividing a domain of the part into sub-domains,
   Solving each of the sufficiently small sub-domains independently as a simplified trinary zoning statement with the fewest zones and analytic surfaces required to isolate the part from the void space,
   Regressing back through the decomposition process to reunite the sub-domains; and
   Repeating the solution procedure with each reunited sub-domain until the entire geometry has been reunited into an optimized trinary zoning statement.

4. The computer implemented system of claim 1, wherein the translation program performs the translation by:
   Calculating analytic bounding surfaces from the trimmed surfaces;
   Comparing the analytic bounding surfaces to each other to form the ambiguity surfaces, said bounding and ambiguity surfaces forming the list of analytic surfaces;
   Comparing each node to each of the analytic surfaces to create a sequence of nodal zoning statements; and
   Eliminating redundant nodal zoning statements to form the initial well-posed zoning statement.

5. The computer implemented system of claim 1, wherein the ray-tracing program executes radiation transport codes to characterize the motion of energetic particles through matter in the part and analyze the effects of radiation on the assembly.

6. The computer implemented system claim 1, wherein the ray-tracing program analyzes one of nuclear radiation transport, optical design, stray light analysis, thermal radiation transport or visual scene rendering.

7. A computer implemented system comprising:
   a CAD system that generates a CAD model for an assembly including at least one mechanical part, said CAD model producing a list of trimmed surfaces for each said part that form a bounded analytic representation of a high order geometry surface in space;
   a software tool that discretizes the part to produce a first list of nodes that lie on the part and a second list of nodes that lie in a void space;
   a translation program that translates the lists of trimmed surfaces and nodes into a surface-based combinatorial geometry (SBCG) format including a list of analytic surfaces having bounding surfaces and ambiguity surfaces and a well-posed zoning statement and optimizing the well-posed zoning statement to eliminate redundant analytic surfaces and merge zones subject to a constraint that the zoning statement remain well-posed, wherein the translation program optimizes the zoning statement by:
      representing the zoning statement as a truth table in which the rows correspond to different nodal zoning statements, the columns correspond to different analytic surfaces on the list and the entries are binary T and F to relate the position of the nodes to the analytic surfaces,
      recursively bisecting the initial truth table into T and F sub-tables,
      using a genetic algorithm to form a well-posed seed organism from the sub-table using a trinary representation including T, F and N/A which allows for either a T or F entry, creating a pool of initial organisms from the seed by changing some of the T and F entries to N/A, breeding and scoring the pool until the population stabilizes, and selecting the highest scoring well-posed trinary zoning statement, and
      recursively recombining the sub-tables in the trinary representation to form a well-posed zoning statement for the reunited truth table while using the same genetic algorithm to optimize each reunited truth table T using the previous solutions as a starting point; and
   a ray-tracing program that operates on data in the SBCG format for said at least one mechanical part to analyze non-mechanical properties of the assembly.

8. The computer implemented system of claim 7, wherein the genetic algorithm scores the organisms assigning any ill-posed organisms a score less than that of the seed organism and assigning any remaining organisms a score that is inversely proportional to the number of unique rows in the sub-table and proportional to the number of N/A entries in those unique rows.

9. A computer implemented system, comprising:
   a CAD system that generates a CAD model for an assembly including at least one mechanical part, said CAD model producing a list of trimmed surfaces for each said part that form a bounded analytic representation of a high order geometry surface in space;

a software tool that discretizes the art to produce a first list of nodes that lie on the part and a second list of nodes that lie in a void space;

a translation program that translates the lists of trimmed surfaces and nodes into a surface-based combinatorial geometry (SBCG) format including a list of analytic surfaces having bounding surfaces and ambiguity surfaces and a well-posed zoning statement by (a) calculating analytic bounding surfaces from the trimmed surfaces, (b) comparing the analytic bounding surfaces to each other to form the ambiguity surfaces, said bounding and ambiguity surfaces forming the list of analytic surfaces, (c) comparing each node to each of the analytic surfaces to create a sequence of nodal zoning statements, if the distance of the node to any one of the analytic surfaces is less than a specified tolerance length, the node is discarded and (d) eliminating redundant nodal zoning statements to form the initial well-posed zoning statement and optimizes the well-posed zoning statement to eliminate redundant analytic surfaces and merge zones subject to a constraint that the zoning statement remain well-posed; and a ray-tracing program that operates on data in the SBCG format for said at least one mechanical part to analyze non-mechanical properties of the assembly.

10. A computer implemented system, comprising:
a CAD system that generates a CAD model for an assembly including at least one mechanical part, said CAD model producing a list of trimmed surfaces for each said part that form a bounded analytic representation of a geometric surface in space;
a software tool that produces a first list of nodes that lie within the part and a second list of nodes that lie within any void spaces internal or external to the part;
a translation program that translates the lists of trimmed surfaces and nodes into a list of analytic surfaces having bounding surfaces and ambiguity surfaces, refines the lists of nodes such that the first one consists of only nodes that lie within the part but at least a first specified tolerance length away from any of the analytic surfaces and the second one consists of only nodes that lie within the void space but at least a second specified tolerance length away from any of the analytic surfaces, formulates a well-posed zoning statement from the list of analytic surfaces and the refined lists of nodes, and writes the list of analytic surfaces and the well-posed zoning statement in a form that is compatible with a surface-based combinatorial geometry (SBCG) format; and
a ray-tracing program that operates on data in the SBCG format for said at least one mechanical part to analyze non-mechanical properties of the assembly.

11. The computer implemented system of claim 10, wherein the software tool produces the lists of candidate nodes using a mesh or random node generation.

12. The computer implemented system of claim 11, wherein the software tool includes a finite element (FE) program that generates the mesh.

13. A computer implemented system, comprising:
a CAD system that generates a CAD model for an assembly including at least one mechanical part, said CAD model producing a list of trimmed surfaces for each said part that form a bounded analytic representation of a geometric surface in space;
a software tool that produces a first list of nodes that lie within the part and a second list of nodes that lie within any void spaces internal or external to the part;

a translation program that translates the lists of trimmed surfaces and nodes into a surface-based combinatorial geometry (SBCG) format including a list of analytic surfaces having bounding surfaces and ambiguity surfaces and a well-posed zoning statement by (a) calculating analytic bounding surfaces from the trimmed surfaces, (b) comparing the analytic bounding surfaces to each other to form the ambiguity surfaces, said bounding and ambiguity surfaces forming the list of analytic surfaces, (c) comparing each node to each of the analytic surfaces to create a sequence of nodal zoning statements, if the distance of the node to any one of the analytic surfaces is less than a specified tolerance length, the node is discarded and (d) eliminating redundant nodal zoning statements to form the initial well-posed zoning statement; and a ray-tracing program that operates on data in the SBCG format for said at least one mechanical part to analyze non-mechanical properties of the assembly.

14. The computer implemented system of claim 13, wherein the list of trimmed surfaces includes a number of entities, a type designator for each entity and a translation matrix, said translation program calculating the analytic boundary surfaces by:
Examining each entity to determine a type of geometric object; and
Mapping the entity to the analytic bounding surface for the geometric object with the proper translation.

15. The computer implemented system of claim 14, wherein the analytic forms for b-spline planes, toroids, spheres, revolved planes, cylinders or revolved cone objects are extracted from the information regarding trimmed surfaces.

16. The computer implemented system of claim 13, wherein the translation program forms the ambiguity surfaces by:
Performing a pair-wise comparison of all the bounding surfaces;
Determining whether a condition exists between each pair of bounding surfaces; and, if so,
Generating a specific analytical ambiguity surface to differentiate regions of space that the bounding surfaces may be insufficient to distinguish.

17. The computer implemented system of claim 16, wherein the ambiguity surfaces are generated using a library that contains a plurality of pair-wise comparisons, the associated conditions and the formulae for the ambiguity surfaces.

18. The computer implemented system of claim 13, wherein each nodal zoning statement comprises a string of signed numbers that designate the binary positional relationship to each of the analytic surfaces.

19. The computer implemented system of claim 18, wherein the zoning-statement comprises a truth table in which each row corresponds to one of the nodal zoning statements for a node that is placed uniquely with regard to all of the analytic surfaces, each column represents the position of each node with respect to a different analytic surface, and each entry is the sign representing the binary positional relationship between the corresponding node and surface.

20. A computer implemented system, comprising:
a CAD system that generates a CAD model for an assembly including at least one mechanical part, said CAD model producing a list of trimmed surfaces for each said part that form a bounded analytic representation of a geometric surface in space;

a software tool that produces a first list of nodes that lie on the part and a second list of nodes that lie in a void space;

a translation program that translates the lists of trimmed surfaces and nodes into a surface-based combinatorial geometry (SBCG) format including a list of analytic surfaces having bounding surfaces and ambiguity surfaces and a well-posed zoning statement represented as an unoptimized truth table in which the original rows correspond to different nodal zoning statements and the columns correspond to different analytic surfaces and the T and F entries relate the position of the nodes to the analytic surfaces and optimizing the well-posed zoning statement to eliminate redundant analytic surfaces and merge zones subject to a constraint that the zoning statement remain well-posed, said translation program enforcing the constraint by testing each original row of the unoptimized truth table against each row of a candidate optimized truth table and rejecting candidates in which at least one original row is represented by more than one row in the candidate optimized truth-table; and a ray-tracing program that operates on data in the SBGG format for said at least one mechanical part to analyze non-mechanical properties of the assembly.

21. The method computer implemented system of claim 20, wherein the zoning statement is represented as a truth table T in which the rows correspond to different nodal zoning statements, the columns correspond to different analytic surfaces on the list and the entries are binary T and F to relate the position of the nodes to the analytic surfaces, wherein the translation program optimizes well-posed zoning statement by:

recursively bisecting the initial truth table into T and F sub-tables, using a genetic algorithm to form a well-posed seed organism from the sub-table using a trinary representation including T, F and N/A which allows for either a T or F entry, creating a pool of initial organisms from the seed by changing some of the T and F entries to N/A, breeding and scoring the pool until the population stabilizes, and selecting the highest scoring well-posed trinary zoning statement, and recursively recombining the sub-tables in the trinary representation to form a well-posed zoning statement for the reunited truth table while using the same genetic algorithm to optimize each reunited truth table T using the previous solutions as a starting point.

22. The computer implemented system of claim 21, wherein the genetic algorithm scores the organisms by assigning any ill-posed organisms a score less than that of the seed organism and assigning any remaining organisms a score that is inversely proportional to the number of unique rows in the sub-table and proportional to the number of N/A entries in those unique rows.

23. A computer implemented system, comprising:

a CAD system that generates a CAD model for an assembly including at least one mechanical part, said CAD model producing a list of trimmed surfaces for each said part that form a bounded analytic representation of a geometric surface in space;

a software tool that produces a first list of nodes that lie within the part and a second list of nodes that lie within any void spaces internal or external to the part;

a translation program that (a) translates the lists of trimmed surfaces and nodes into a list of analytic surfaces having bounding surfaces and ambiguity surfaces, formulates a well-posed zoning statement from the list of analytic surfaces and the refined lists of nodes, and writes the list of analytic surfaces and the well-posed zoning statement in a form that is compatible with a surface-based combinatorial geometry (SBCG) format and (b) optimizes the zoning statement by merging zones and eliminating references to redundant analytic surfaces with a binary minimization algorithm by, Iteratively subdividing a domain of the part into sub-domains by selecting a truth table T for the domain of the part, its complement F for the void space(s), and an associated mandatory table M; selecting a bisection column; generating sub-tables TA,TB for the T table at the bisection column corresponding to the sub-domains; generating the complement sub-tables A, FB; splitting the M table into sub-tables MA, MB at the bisection column; simplifying the sub-tables TA,TB, the complements FA,FB and the M sub-tables MA, MB; and repeating the process recursively for each T sub-table until they are sufficiently small, Solving each of the sufficiently small sub-domains independently as a simplified trinary zoning statement with the fewest zones and analytic surfaces required to isolate the part from the void space, Regressing back through the decomposition process to reunite the sub-domains; and Repeating the solution procedure with each reunited sub-domain until the entire geometry has been reunited into an optimized trinary zoning statement; and a ray-tracing program that operates on data in the SBCG format for said at least one mechanical part to analyze non-mechanical properties of the assembly.

24. The computer implemented system of claim 23, wherein the bisection column is selected in accordance with one or more criteria selected from Node Weighted Surface Selection, Area Weighted Surface Selection, Surface Selection by Type or Surface Selection by Parameter.

25. The computer implemented system of claim 23, wherein the sub-tables are simplified by, eliminating duplicate rows, removing unnecessary columns, and eliminating any remaining duplicative rows.

26. The computer implemented system of claim 23, wherein the small sub-domains are solved by, Opening a T sub-table for one of the sub-domains and its complement;

Forming a seed organism from the T sub-table as a trinary zoning statement;

Creating a pool of initial organisms from the seed;

Breeding the pool until the population stabilizes; and

Selecting the highest scoring trinary zoning statement.

27. The computer implemented system of claim 26, wherein the regression is accomplished by, Selecting a sub-table T and its complement F from the next higher level of sub-domains, Extracting the two minimized trinary zoning statements for the sub-table T, Forming a seed organism from the two minimized trinary zoning statements;

Creating a pool of initial organisms from the seed;

Breeding the pool until the population stabilizes; and

Selecting the highest scoring trinary zoning statement.

28. A computer implemented system-comprising:
- a CAD system that generates a GAD model for an assembly including at least one mechanical part, said CAD model producing a list of trimmed surfaces for each said part that form a bounded analytic representation of a geometric surface in space;
- a software tool that produces a first list of nodes that lie on the part and a second list of nodes that lie in a void space;
- a translation program that translates the lists of trimmed surfaces and nodes into a surface-based combinatorial geometry (SBCG) format including a list of analytic surfaces having bounding surfaces and ambiguity surfaces and a well-posed zoning statement and optimizes the well-posed zoning statement by:
  - a) representing the zoning statement as a truth table in which the rows correspond to different nodal zoning statements, the columns correspond to different analytic surfaces on the list and the entries are binary T and F to relate the position of the nodes to the analytic surfaces,
  - b) iteratively subdividing the T truth table into pairs of sub-tables along branches at progressively lower levels until the remaining sub-tables are smaller than a threshold size;
  - c) using a genetic algorithm to solve each of the sub-tables at the lowest level independently from respective seed organisms as a sub-solution;
  - d) for each pair of sub-tables at the lowest remaining level, combining their sub-solutions to form the seed organism to seed the genetic algorithm to solve the sub-table at the next higher level up the branch and refine the sub-solution; and
  - e) repeating step (d) at least once to generate a solution for the well-posed zoning statement; and
- a ray-tracing program that operates on data in the SBCG format for said at least one mechanical part to analyze non-mechanical properties of the assembly.

29. The computer implemented system of claim 28, wherein the lists of nodes are generated by,
- Writing two lists of candidate nodes that cover the part and the void spaces, and
- Refining these lists of nodes such that the first one consists of only nodes that lie within the part but at least a first specified tolerance length away from any of the analytic surfaces and the second one consists of only nodes that lie within the void spaces but at least a second specified tolerance length away from any of the analytic surfaces.

30. A computer implemented system-comprising:
- a CAD system that generates a CAD model for an assembly including at least one mechanical part, said CAD model producing a list of trimmed surfaces for each said part that form a bounded analytic representation of a geometric surface in space;
- a software tool that produces a first list of nodes that lie on the part and a second list of nodes that lie in a void space;
- a translation program that translates the lists of trimmed surfaces and nodes into a surface-based combinatorial geometry (SBCG) format including a list of analytic surfaces having bounding surfaces and ambiguity surfaces and a well-posed zoning statement and optimizes the well-posed zoning statement by:
  - a) representing the zoning statement as a truth table in which the rows correspond to different nodal zoning statements, the columns correspond to different analytic surfaces on the list and the entries are binary T and F to relate the position of the nodes to the analytic surfaces,
  - b) recursively bisecting the T truth table into pairs of sub-tables along branches at progressively lower levels until the remaining sub-tables are smaller than a threshold size;
  - c) using a genetic algorithm to solve the T sub-tables at the lowest level independently as a sub-solution, said genetic algorithm forming a binary seed organism from the T sub-table, creating a pool of trinary organisms by setting some of the genes in the seed organism to 0 representing either T or F, eliminating low scoring organisms and breeding the organisms until the scores stabilize, and selecting a high scoring organism for the sub-solution;
  - d) for each pair of sub-tables at the lowest remaining level, combining their sub-solutions to form a trinary seed organism to seed the genetic algorithm to solve the sub-table at the next higher level up the branch and refine the sub-solution;
  - e) repeating step (d) at least once to recursively generate a solution for the well-posed zoning statement; and
- a ray-tracing program that operates on data in the SBCG format for said at least one mechanical part to analyze non-mechanical properties of the assembly.

* * * * *

UNITED STATES PATENT AND TRADEMARK OFFICE
CERTIFICATE OF CORRECTION

| | |
|---|---|
| PATENT NO. | : 7,321,364 B2 |
| APPLICATION NO. | : 10/838411 |
| DATED | : January 22, 2008 |
| INVENTOR(S) | : Manson |

It is certified that error appears in the above-identified patent and that said Letters Patent is hereby corrected as shown below:

Column 19, line 42, claim 2, delete "welt-posed" and replace with --well-posed--;

Column 23, line 26, claim 21, delete "method";

Column 24, line 17, claim 23, delete "A" and replace with --FA--.

Signed and Sealed this

Third Day of June, 2008

JON W. DUDAS
*Director of the United States Patent and Trademark Office*